(12) United States Patent
Hassan et al.

(10) Patent No.: US 11,749,466 B1
(45) Date of Patent: Sep. 5, 2023

(54) LIGHT HARVESTING SUPERCAPACITOR AND METHOD OF PREPARATION THEREOF

(71) Applicants: KING FAHD UNIVERSITY OF PETROLEUM AND MINERALS, Dhahran (SA); King Abdullah City for Atomic & Renewable Energy (K.A.CARE), Riyadh (SA)

(72) Inventors: Muhammad Hassan, Dhahran (SA); Mohammad A. Gondal, Dhahran (SA); Talal F. Qahtan, Dhahran (SA); Mohamed Abdulkader Dastageer, Dhahran (SA)

(73) Assignees: KING FAHD UNIVERSITY OF PETROLEUM AND MINERALS, Dhahran (SA); King Abdullah City for Atomic & Renewable Energy (K.A.CARE), Riyadh (SA)

( * ) Notice: Subject to any disclaimer, the term of this patent is extended or adjusted under 35 U.S.C. 154(b) by 0 days.

(21) Appl. No.: 17/887,824

(22) Filed: Aug. 15, 2022

(51) Int. Cl.
*H01G 9/20* (2006.01)
*H01G 13/00* (2013.01)
*H01G 9/04* (2006.01)

(52) U.S. Cl.
CPC .............. *H01G 9/2031* (2013.01); *H01G 9/04* (2013.01); *H01G 9/2009* (2013.01); *H01G 9/2068* (2013.01); *H01G 13/00* (2013.01)

(58) Field of Classification Search
None
See application file for complete search history.

(56) References Cited

U.S. PATENT DOCUMENTS

| | | | |
|---|---|---|---|
| 9,966,549 B2 * | 5/2018 | Lee | H01M 4/96 |
| 10,069,459 B1 * | 9/2018 | Takshi | H02J 7/35 |
| 2017/0077516 A1 * | 3/2017 | Lee | H01G 9/2022 |

FOREIGN PATENT DOCUMENTS

| | | | | |
|---|---|---|---|---|
| CN | 102509637 A | 6/2012 | | |
| CN | 108022756 A * | 5/2018 | ............. | C25D 11/08 |

(Continued)

OTHER PUBLICATIONS

Ganesh, et al. ; Acrylamide based proton conducting polymer gel electrolyte for electric double layer capacitors ; Ionics (2008) 14 ; pp. 339-343 ; 5 Pages.

(Continued)

*Primary Examiner* — Dion R. Ferguson
(74) *Attorney, Agent, or Firm* — Oblon, McClelland, Maier & Neustadt, L.L.P.

(57) ABSTRACT

A light harvesting supercapacitor and a method of preparing the light harvesting supercapacitor are disclosed. The light harvesting supercapacitor includes a transparent substrate, an active layer including $TiO_2$ nanoparticles and polyaniline (PANI) nanoparticles disposed on the transparent substrate, an electrolyte layer including a solid separator and poly(2-acrylamido-2-methyl-1-propanesulfonic acid) disposed on the active layer, a carbon electrode disposed on the electrolyte layer; and a metal layer disposed on the activated carbon electrode. The method of preparing the light harvesting supercapacitor involves pulsed laser ablation in a liquid of bulk PANI to form the PANI nanoparticles. The light harvesting supercapacitor can be used in a photovoltaic device.

20 Claims, 19 Drawing Sheets

(56) References Cited

FOREIGN PATENT DOCUMENTS

| | | | | |
|---|---|---|---|---|
| CN | 108352254 A | * | 7/2018 | ........... H01G 9/0036 |
| CN | 108531954 A | | 9/2018 | |
| CN | 111739738 A | * | 10/2020 | ............... H01G 9/20 |
| CN | 113823831 A | * | 12/2021 | |
| IN | 201611009250 | | 9/2017 | |
| KR | 10-1389826 | | 5/2014 | |
| KR | 20210108663 A | * | 9/2021 | |
| WO | WO-2012157773 A1 | * | 11/2012 | ........... H01G 9/2022 |

OTHER PUBLICATIONS

Lee, et al. ; Bond Strength of TiO2 Coatings onto FTO Glass for a Dye-sensitized Solar Cell ; Journal of Sensor Science and Technology, vol. 21, No. 6 (2012) ; pp. 395-401 ; 7 Pages.

Lim, et al. ; A comparative study of the polyaniline thin films produced by the cluster beam deposition and laser ablation methods ; The Journal of Chemical Physics, vol. 124, Issue 1 ; Nov. 2005 ; Abstract Only ; 2 Pages.

Yin, et al. ; A Polymer Supercapacitor Capable of Self-Charging under Light Illumination ; The Journal of Physical Chemistry C ; Mar. 31, 2015 ; Abstract Only ; 2 Pages.

\* cited by examiner

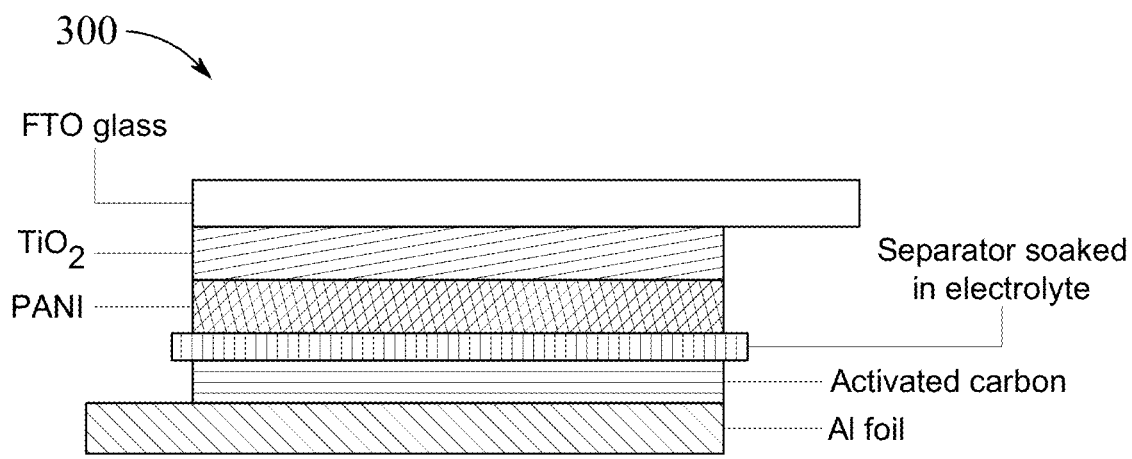
FIG. 3A
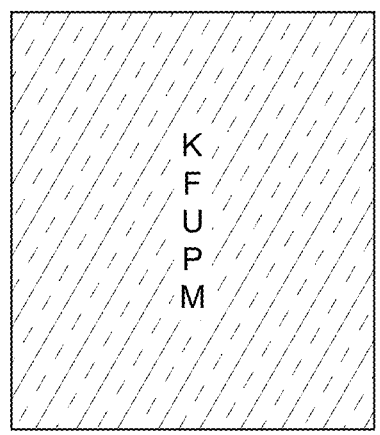 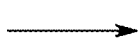 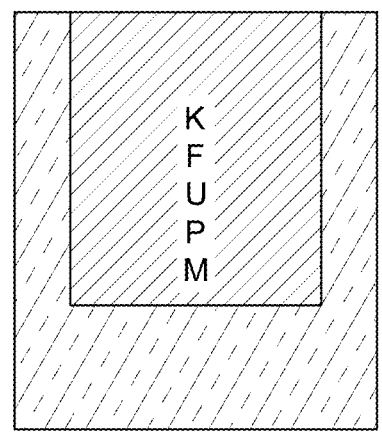
FIG. 3B　　　　　　　　FIG. 3C

LIGHT HARVESTING SUPERCAPACITOR AND METHOD OF PREPARATION THEREOF

BACKGROUND

Technical Field

The present disclosure is directed to energy storage devices, and particularly to a light harvesting supercapacitor and a method of making the light harvesting supercapacitor.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Use of fossil fuels for energy has exacted an enormous toll on humanity and the environment—from air and water pollution to climate change. To tackle climate change including global warming, efforts are being made to use renewable, low cost, environmental friendly, and abundantly available sources of energy, such as solar energy. Numerous methods to convert solar energy to electrical energy are known in the art. Commonly used devices to store electrical energy are batteries and supercapacitors. Supercapacitors are energy storage devices with large specific capacitance, high power density and long term stability.

In recent years, supercapacitors with the ability to self-charge when exposed to light are being increasingly used for developing next-generation energy storage devices. For example, Liu, et. al. reported a photo switchable micro supercapacitor (MSC) composed of graphene and diarylethene composite film [Liu, Z., et. al., J. Am. Chem. Soc., 2017, 139, 28, 9443-9446]. Manjakkal, et. al. reported a light responsive self-charging supercapacitor uses graphene-Ag-graphene foam electrodes with an areal capacitance value of 38 mF $cm^{-2}$ at a current density of 0.67 mA $cm^{-2}$ [Manjakkal, L., et. al., Nano Energy, 2018, 51, 604-312]. Roy, et. al. reported a self-charging supercapacitor is an organic photovoltaic cell using folic acid and polyvinylidene fluoride (PVDF) composite film with a specific capacitance value of 61 F $g^{-1}$ at a energy density of 7.84 mWh $g^{-1}$ [Roy, S., et. al., ACS Appl. Mater. Interfaces, 2017, 9, 28, 24198-24209] However, each of these examples has very poor supercapacitor performance.

These devices have low capacitance and low energy density. These devices sacrifice supercapacitor performance characteristics in order to achieve the self-charging or light-harvesting properties. Accordingly, it is an objective of the present disclosure to provide a supercapacitor which has a self-charging ability and better supercapacitor performance characteristics, such as higher capacitance and energy density.

SUMMARY

In an exemplary embodiment, a light harvesting supercapacitor is described. The light harvesting supercapacitor includes a transparent substrate, an active layer including $TiO_2$ nanoparticles and polyaniline nanoparticles disposed on the transparent substrate, an electrolyte layer including a solid separator and poly (2-acrylamido-2-methyl-1-propanesulfonic acid) disposed on the active layer, a carbon electrode disposed on the electrolyte layer, and a metal layer disposed on the (activated) carbon electrode.

In some embodiments, the transparent substrate is fluorine-doped tin oxide (FTO) coated glass.

In some embodiments, the transparent substrate is polyethylene terephthalate.

In some embodiments, the active layer includes a $TiO_2$ sub-layer and a polyaniline sublayer. The $TiO_2$ sub-layer includes the $TiO_2$ nanoparticles, and the polyaniline sub-layer includes the polyaniline nanoparticles.

In some embodiments, the $TiO_2$ sub-layer is disposed on the transparent substrate and the polyaniline sub-layer is disposed on the $TiO_2$ sub-layer such that the polyaniline sub-layer does not contact the transparent substrate.

In some embodiments, the $TiO_2$ nanoparticles are crystalline by Powder X-ray Diffraction (PXRD), adopt the anatase crystal structure, and have a mean particle size of 1 to 100 nanometers (nm).

In some embodiments, the polyaniline nanoparticles have a mean particle size of 10 to 200 nm.

In some embodiments, the electrolyte layer includes a paper separator soaked with poly(2-acrylamido-2-methyl-1-propanesulfonic acid).

In some embodiments, the carbon electrode includes activated carbon, conductive carbon, and polyvinylidene fluoride (PVDF).

In some embodiments, the metal layer is an aluminum layer.

In some embodiments, the light harvesting supercapacitor has a specific capacitance of 125 to 150 farad per gram (F/g) at a current density of 0.3 to 0.5 ampere per gram (A/g).

In some embodiments, the light harvesting supercapacitor has an energy density of 10 to 20-watt hour per kilogram (W·h/kg) and a power density of 875 to 950 watt per kilogram (W/kg).

In some embodiments, the light harvesting supercapacitor has a bandgap of 2.5 to 2.95 electron volt (eV).

In another exemplary embodiment, a method of preparing the light harvesting supercapacitor is described. The method includes coating the transparent substrate with a paste including the $TiO_2$ nanoparticles to form a coated substrate. The method further includes heating the coated substrate to form an intermediate structure, and further immersing the first intermediate structure in a dispersion including the polyaniline nanoparticles and a solvent to form a first device portion. Furthermore, the method includes disposing the carbon electrode on a metal substrate to form a second device portion, and subsequently sandwiching the electrolyte layer between the active layer of the first device portion and the carbon electrode of the second device portion to form the light harvesting supercapacitor.

In some embodiments, the polyaniline nanoparticles are formed by exposing a suspension of polyaniline in a nanoparticle synthesis solvent to a pulsed laser having a wavelength of 525 to 550 nm and a pulse energy of 275 to 425 millijoules per pulse (mJ/pulse).

In some embodiments, the nanoparticle synthesis solvent is an alcohol having 1 to 4 carbon atoms and the polyaniline is present in the suspension in an amount of 1 to 4 milligram per milliliter (mg/mL) of the suspension.

In some embodiments, the method includes immersing the first intermediate structure in a dispersion for 12 to 48 hours to form the first device portion.

In some embodiments, the method includes coating the transparent substrate with the paste by doctor blade-coating to form the coated substrate.

In some embodiments, the transparent substrate is FTO coated glass and the heating is performed at 400 to 600° C.

In an exemplary embodiment, a photovoltaic device including the light harvesting supercapacitor is described.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3A is a schematic diagram of a fabricated device architecture, according to certain embodiments;

FIG. 3B is a pictorial image of a fluorine-doped tin oxide (FTO) conductive glass slide coated with titanium dioxide ($TiO_2$), according to certain embodiments;

FIG. 3C is a pictorial image of polyaniline (PANI) adsorbed $TiO_2$ film on the FTO conductive glass, according to certain embodiments;

DETAILED DESCRIPTION

Definitions

Figure 1:
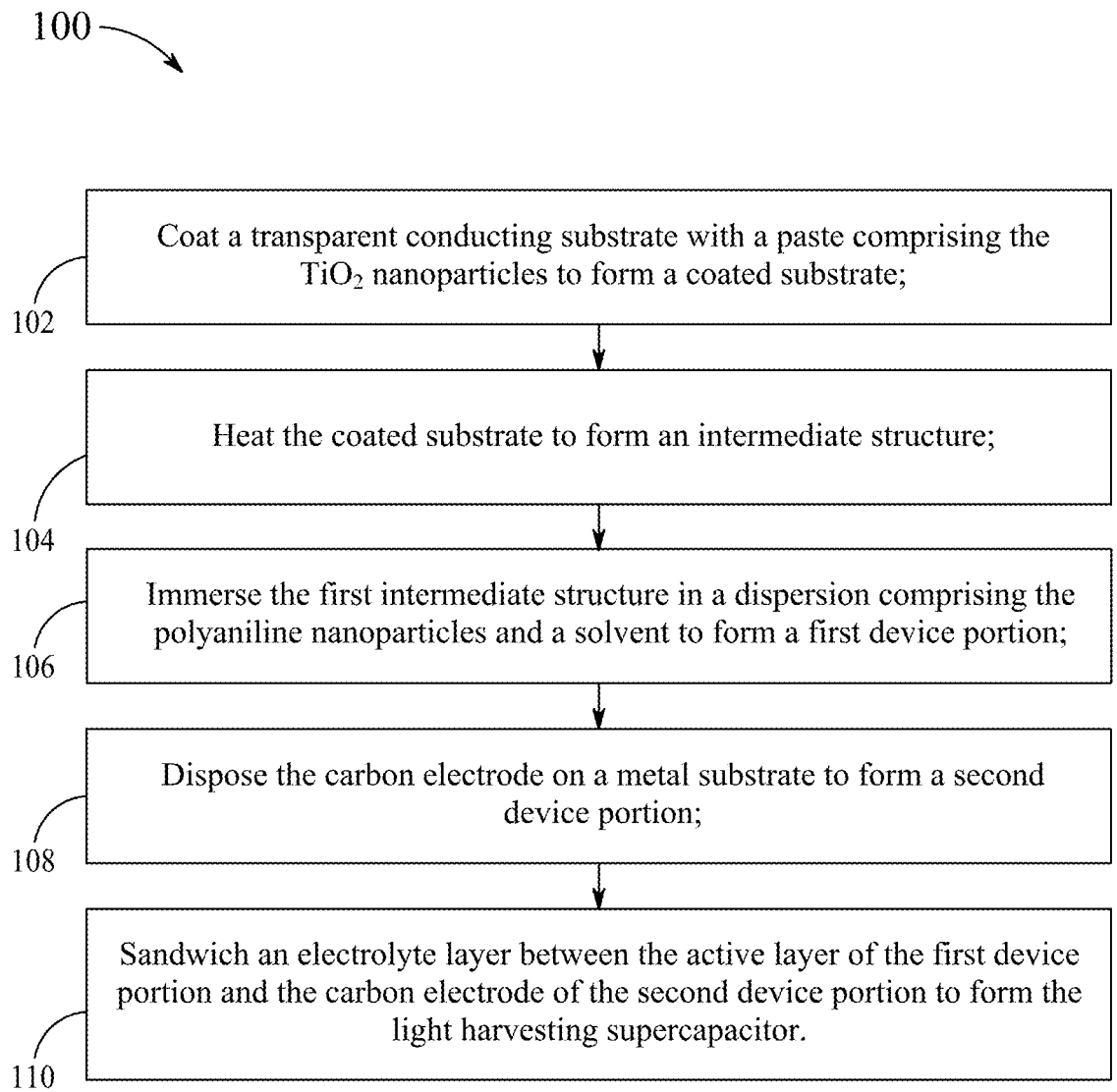
FIG. 1 is a schematic flow diagram of preparing a light harvesting supercapacitor, according to certain embodiments

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Light Harvesting Supercapacitor

According to a first aspect, the present disclosure is directed towards a self-charging light harvesting supercapacitor 300 (also referred to as the device 300). The light harvesting supercapacitor does not need to be supplied with an external voltage bias for its operation. The light harvesting supercapacitor comprises a transparent substrate, an active layer comprising $TiO_2$ nanoparticles and polyaniline (PANI) nanoparticles disposed on the transparent substrate, an electrolyte layer comprising a solid separator and poly (2-acrylamido-2-methyl-1-propanesulfonic acid) disposed on the active layer, a carbon electrode disposed on the electrolyte layer, and a metal layer disposed on the activated carbon electrode. These components may be divided into the following subunits for ease of discussion and/or understanding. First, a photoelectrode comprising the transparent substrate and active layer. Next, a separator or electrolyte comprising the solid separator and poly(2-acrylamido-2-methyl-1-propanesulfonic acid), also known as PAMPS. Third, a back electrode comprising the carbon electrode and the metal layer.

In general, the transparent substrate may be any suitable transparent substrate known to one of ordinary skill in the art. The transparent substrate may be rigid or may be flexible. The transparent substrate should be substantially transparent in the visible and/or UV regions. That is, the substrate should permit at least 75%, preferably at least 80%, preferably at least 85%, preferably at least 90%, preferably at least 95%, preferably at least 97.5%, preferably at least 99%, preferably at least 99.5% of incident visible and/or UV radiation to pass through the transparent substrate. Examples of suitable rigid transparent substrates include glass, FTO glass, ITO glass, sapphire (crystalline alumina), aluminum doped zinc oxide (AZO), yttria, silica, yttrium aluminum garnet (YAG), diamond, quartz, poly (methyl methacrylate), polycarbonate, polyethylene, polyethylene terephthalate, polylactic acid, polyvinyl butyral, poly(3,4-ethylenedioxythiophene) (PEDOT) and mixtures or copolymers thereof such as poly(3,4-ethylenedioxythiophene)-tetramethacrylate (PEDOT-TMA) and poly(3,4-ethylenedioxythiophene) polystyrene sulfonate (PEDOT:PSS), and the like. In some embodiments, the transparent substrate is fluorine-doped tin oxide (FTO) coated glass. In some embodiments, the transparent substrate is polyethylene terephthalate. In some embodiments, the polyethylene terephthalate is flexible and/or stretchable.

The device 300 further includes a thin film of an active layer on the transparent substrate. The thickness of the active film may be in a range of a few hundred micrometers to nanometers. In some embodiments, the active layer comprises a $TiO_2$ sub-layer comprising the $TiO_2$ nanoparticles and a polyaniline (PANT) sub-layer comprising the polyaniline (PANT) nanoparticles. In some embodiments, the $TiO_2$ sub-layer is disposed on the transparent substrate and the polyaniline sub-layer is disposed on the $TiO_2$ sub-layer such that the polyaniline sub-layer does not contact the transparent substrate. In some embodiments, the active layer has a thickness of 1 to 500 µm, preferably 2.5 to 490 µm, preferably 5 to 480 µm, preferably 7.5 to 470 µm, preferably 10 to 460 µm, preferably 12.5 to 450 µm, preferably 15 to 440 µm, preferably 17.5 to 430 µm, preferably 20 to 420 µm, preferably 22.5 to 410, preferably 25 to 400 µm. For example, the active layer may have a thickness from 27.5 to 390 µm, or 30 to 380 µm, or 32.5 to 370 µm, or 35 to 360 µm, or 37.5 to 350 µm, or 40 to 340 µm, or 42.5 to 330 µm, or to 320 µm, or 47.5 to 310 µm, or 50 to 300 µm, or 52.5 to 290 µm, or 55 to 280 µm, or 57.5 to 270 µm, or 60 to 260 µm, or 62.5 to 250 µm, or 65 or 240 µm, or 67.5 to 230 µm, or 70 to 220 µm, or 72.5 to 210 µm, or 75 to 200 µm. In some embodiments, the $TiO_2$ sub-layer has a thickness of 0.5 to 490 µm, preferably 1 to 480 µm, preferably 2.5 to 470 µm, preferably 5 to 460 µm, preferably 7.5 to 450 µm, preferably 10 to 440 µm, preferably 12.5 to 430 µm, preferably 15 to 420 µm, preferably 17.5 to 410 µm, preferably 17.5 to 400 µm, preferably 20 to 400 µm. For example, the $TiO_2$ sub-layer may have a thickness from 22.5 to 390 µm, or 25 to 380 µm, or 27.5 to 370 µm, or 30 to 360 µm, or 32.5 to 350 µm, or 35 to 340 µm, or 37.5 to 330 µm, or 40 to 320 µm, or 42.5 to 310 µm, or 45 to 300 µm, or 47.5 to 290 µm, or 50 to 280 µm, or 52.5 to 270 µm, or 55 to 260 µm, or 57.5 to 250 µm, or 60 to 240 µm, or 62.5 to 230 µm, or 65 to 220 µm, or 67.5 to 210 µm, or 70 to 200 µm. In some embodiments, the polyaniline sub-layer has a thickness of 0.5 to 490 µm, preferably 1 to 480 µm, preferably 2.5 to 470 µm, preferably 5 to 460 µm, preferably 7.5 to 450 µm, preferably 10 to 440 µm, preferably 12.5 to 430 µm, preferably 15 to 420 µm, preferably 17.5 to 410 µm, preferably 17.5 to 400 µm, preferably 20 to 400 µm. For example, the polyaniline sub-layer may have a thickness from 22.5 to 390 µm, or 25 to 380 µm, or 27.5 to 370 µm, or 30 to 360 µm, or 32.5 to 350 µm, or 35 to 340 µm, or 37.5 to 330 µm, or 40 to 320 µm, or 42.5 to 310 µm, or 45 to 300 µm, or 47.5 to 290 µm, or 50 to 280 µm, or 52.5 to 270 µm, or 55 to 260 µm, or 57.5 to 250 µm, or 60 to 240 µm, or 62.5 to 230 µm, or 65 to 220 µm, or 67.5 to 210 µm, or 70 to 200 µm.

In general, the $TiO_2$ nanoparticles can be any shape known to one of ordinary skill in the art. Examples of suitable shapes the $TiO_2$ nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For $TiO_2$ nanoparticles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the $TiO_2$ nanoparticles are envisioned as having in any embodiments.

In some embodiments, the $TiO_2$ nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of $TiO_2$ nanoparticles having a different shape. As used herein, the term "non-uniform shape" refers to an average consistent shape that differs by more than 10% of the distribution of $TiO_2$ nanoparticles having a different shape. In one embodiment, the shape is uniform and at least 90% of the $TiO_2$ nanoparticles are spherical or substantially circular, and less than 10% are polygonal. In another embodiment, the shape is non-uniform and less than 90% of the $TiO_2$ nanoparticles are spherical or substantially circular, and greater than 10% are polygonal.

In some embodiments, the $TiO_2$ nanoparticles have a mean particle size of 1 to 100 nm, preferably 2.5 to 75 nm, preferably 5 to 60 nm, preferably 7.5 to 50 nm, preferably 10 to 40 nm, preferably 12.5 to 35 nm, preferably about 15 to 30 nm. In embodiments where the $TiO_2$ nanoparticles are spherical, the particle size may refer to a particle diameter. In embodiments where the TiO2 nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the $TiO_2$ nanoparticles have an anisotropic shape such as nanorods, the particle size may refer to a length of the nanorod, a width of the nanorod, an average of the length and width of the nanorod. In some embodiments in which the $TiO_2$ nanoparticles have non-spherical shapes, the particle size refers to the diameter of a sphere having an equivalent volume as the particle. In some embodiments in which the $TiO_2$ nanoparticles have non-spherical shapes, the particle size refers to the diameter of a sphere having an equivalent diffusion coefficient as the particle.

In some embodiments, the $TiO_2$ nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the $TiO_2$ nanoparticles of the present disclosure are monodisperse having a particle size distribution ranging from 80% of the average particle size to 120% of the average particle size, preferably 90-110%, preferably 95-105% of the average particle size. In some embodiments, the $TiO_2$ nanoparticles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the $TiO_2$ nanoparticles are crystalline by PXRD. In some embodiments, the crystalline TiO2 nanoparticles adopt the anatase crystal structure. In some embodiments, the $TiO_2$ nanoparticles are present in the $TiO_2$ sub-layer as individual nanoparticles. In some embodiments, the $TiO_2$ nanoparticles are present in the $TiO_2$ sublayer as a monolith, framework, extended network, or other 3D structure comprising $TiO_2$ nanoparticles connected to each other. Such connection can be, for example, as a result of agglomeration or sintering. Such connection may involve contact between adjacent $TiO_2$ nanoparticles such that there is no intervening material, such as organic binders, residual organic solvent, organic plasticizers, and the like. In some embodiments, the 3D structure is porous, the pores being formed from spaces between adjacent $TiO_2$ nanoparticles. In some embodiments, the $TiO_2$ sublayer is substantially free of organic material.

In some embodiments, the $TiO_2$ sub-layer is disposed on the transparent substrate (FTO conductive glass) by a coating method. The coating method may dispose the $TiO_2$ nanoparticles as individual nanoparticles. Such individual nanoparticles may be in the form of a suspension or dispersion in an appropriate a dispersing medium, the suspension or dispersion taking the form of a spreadable material such as a viscous fluid, paste, or gel. Examples of components of suspensions or dispersion of $TiO_2$ nanoparticles include, but are not limited to solvents, surfactants, binders, humectants such as ethylene glycol and sorbitol, biocides, viscosity builders such as polyethylene glycol, colorants, pH adjusters, drying agents, defoamers or combinations thereof.

Examples of surfactants include, but are not limited to polyether/polysiloxane copolymers, alkyl-aryl modified methyl-polysiloxanes, acylated polysiloxanes, sorbitan tristearate, sorbitan monopalmitate, sorbitan triolate, mono glyceride stearate, polyoxyethylene nonylphenyl ether, alkyl-di(aminoethyl) glycine, alkyl polyaminoethylglycine hydrochloride, 2-alkyl-n-carboxyethyl-N-hydroxyethyl imidazolinium betaine, and N-tetradecyl-N, N-substituted betaine Examples of binders include, but are not limited to epoxy resins, modified epoxy resins, polyester resins, novolak resins, cellulosic materials, hydroxypropylcellulose, hydroxyethylcellulose, hydroxypropylmethylcellulose, carboxymethylcellulose, copolymers of vinylidene chloride and acrylonitrile, acrylic acid resins, polyvinyl resins, silicone resins, polyamide resins, vinyl alcohol resins, resol resins, acetal resins, polyacrylonitrile resins, formaldehyde resins, polycarbonate resins, polyimide resins, polyethyleneimine, poly(ethyloxazoline), gelatin, starches, dextrin, amylogen, gum arabic, agar, algin, carrageenan, fucoidan, laminaran, corn hull gum, gum ghatti, karaya gum, locust bean gum, pectin, guar gum, epoxy resins produced by the condensation of epichlorohydrin and Bisphenol A or F, epoxy novolak resins, rubber modified epoxy resins, Bisphenol A based polyester resins, epoxydized o-cresylic novolaks, urethane modified epoxy resins, phosphate modified Bisphenol A epoxy resins, cellulose esters, copolymers of vinylidene chloride and acrylonitrile, poly(meth)acrylates, polyvinyl chloride, silicone resins, polyesters containing hydroxy or carboxy groups, polyamides comprising amino groups or carboxy groups, polymers and copolymers of vinyl alcohol, polyvinylimidazole, polyvinylpyrrolidone, polymers and copolymers of vinylphenol, acrylamide, methylol acrylamide, methylol methacrylamide, polyacrylic acid, methacrylic acid, hydroyethyl acrylate, hydroxethyl methacrylate, maleic anhydride/vinyl methyl ether copolymers, novolak resin, resol resin, polyvinyl phenol resin, copolymers of acrylic acid, polyacetal, poly(methyl methacrylate), polymethacrylic acid, polyacrylonitrile, cellulose acetate, cellulose acetate butyrate, cellulose acetate propionate, melamine formaldehyde resins, polycarbonates, polyimides and urea formaldehyde resins In some embodiments, heat treatment at an elevated temperature is used following the coating method to remove the non-$TiO_2$ components of the suspension or dispersion, such as organic solvents or binders.

PANI is a conductive polymer and has been used as a light harvesting agent. In some embodiments, the PANI nanoparticles are prepared using pulsed laser ablation in liquid (PLAL). The pulsed laser ablation in liquid forms PANI nanoparticles from a bulk sample of PANI by ablation followed by stabilization of small particles in the liquid. In general, the PANI nanoparticles may be any suitable shape as described above. In some embodiments, the PANI nanoparticles are substantially spherical. In some embodiments, The PANI nanoparticles have a mean particle size of 5 to 200 nm, preferably 10 to 175 nm, preferably 15 to 150 nm, preferably 20 to 130 nm, preferably 25 to 125 nm. In some embodiments, the PANI nanoparticles of the present disclosure are monodisperse, having a coefficient of variation or relative standard deviation, expressed as a percentage and defined as the ratio of the particle size standard deviation (σ) to the particle size mean (μ) multiplied by 100 of less than 25%, preferably less than 10%, preferably less than 8%, preferably less than 6%, preferably less than 5%, preferably less than 4%, preferably less than 3%, preferably less than 2%. In some embodiments, the PANI nanoparticles of the present disclosure are monodisperse having a particle size distribution ranging from 80% of the average particle size to 120% of the average particle size, preferably 90-110%, preferably 95-105% of the average particle size. In some embodiments, the PANI nanoparticles are not monodisperse.

In general, the PANI nanoparticles may be formed of PANI having any suitable mean molecular weight. For example, the PANI nanoparticles may be formed from PANI having a mean molecular weight of ~1,000, ~5,000, ~10,000, ~15,000, ~20,000, ~25,000, ~30,000, ~35,000, ~40,000, ~50,000, ~55,000, ~60,000, ~65,000, ~70,000, ~75,000, ~80,000, ~90,000, ~100,000, ~110,000, ~125,000, ~150,000, ~175,000, ~200,000, ~225,000, or ~250,000. Here, the mean molecular weight being "approximately X" or "~X" refers to "X+/−10%".

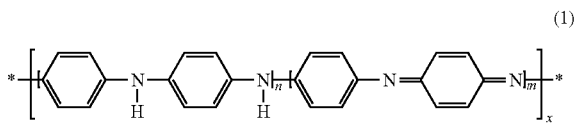

(1)

Polyaniline (PANI) may exist in a number of idealized oxidation states. Referring to structure (1) above, the oxidation state of the PANI may be determined by n and m, where 0≤n,m≤1. Leucoemeraldine with n=1, m=0 is the fully reduced state. Pernigraniline is the fully oxidized state (n=0, m=1) with imine links instead of amine links. The emeraldine form of polyaniline is intermediate between these two (0<n,m<1), ideally with n=m=0.5. Often, it referred to as emeraldine base (EB) if neutral, see structure (2) below. If protonated, it is typically referred to as emeraldine salt (ES), with the imine nitrogens protonated by an acid, see structure (3) below. In structure (3), X⁻ represents anions associated with the positively charged PANI, such as halide anions, nitrate anions, carboxylate anions, or sulfonate anions. Leucoemeraldine and pernigraniline are poor conductors, even when doped with an acid. Preferably, the PANI is an emeraldine PANI. In preferred embodiments, the PANI is an emeraldine salt PANI.

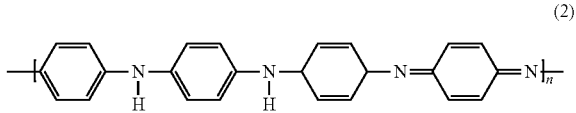

(2)

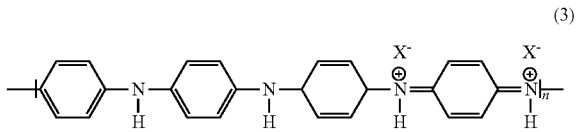

(3)

The device 300 further includes an electrolyte layer including a solid separator and poly (2-acrylamido-2-methyl-1-propanesulfonic acid), also known as PAMPS or PolyAMPS, disposed on the active layer. PAMPS is a water-soluble polymer that typically forms gel-like structure through crosslinks. In some embodiments, the electrolyte layer includes a paper separator soaked with PAMPS. In general, the PAMPS have any suitable mean molecular weight. For example, the PAMPS may have a mean molecular weight of ~100,000, ~250,000, ~500,000, ~750,000, ~1,000,000, ~1,250,000, ~1,500,000, ~1,750,000, ~2,000,000, ~ 2,250,000, ~2,500,000, ~2,750,000, ~3,000,000, ~3,500,000, ~4,000,000, ~4,500,000, ~5,000,000, ~5,500,000, ~6,000,000, ~6,500,000, ~7,000,000, or ~7,500,000. Here, the mean molecular weight being "approximately X" or "~X" refers to "X+/−10%".

The device 300 further includes a carbon electrode disposed on the electrolyte layer. In some embodiments, the carbon electrode comprises a carbon material and a binder. Examples of carbon nanomaterials include carbon nanotubes, carbon nanobuds, carbon nanoscrolls, carbon dots, activated carbon, carbon black, conductive carbon, graphene, graphene oxide, reduced graphene oxide, and nanodiamonds.

The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes. Graphene may be in the form of graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene. Graphene may be in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates. Graphene may be pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. Alternatively, the graphene may be functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene. Alternatively, the graphene may be reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

The carbon nanomaterial may be activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

The carbon nanomaterial may be carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

The carbon nanomaterial may be conductive carbon. Conductive carbon refers to a specific type of activated carbon or carbon black which is amorphous and is a good conductor of electricity, typically having a volume resistivity of 0.01 to 0.1 Ωcm.

In some embodiments, a single type of carbon nanomaterial is used as described above. In alternative embodiments, mixtures of types of carbon nanomaterials are used.

Examples of binders commonly used with carbon electrodes include, but are not limited to polyvinylalochol (PVA), sulfosuccinic-acid (SSA), polytetrafluoroethylene (PTFE), polyvinylidenefluoride (PVDF), and phenolic/resol type polymers crosslinked with, for example poly(methyl vinyl ether-alt-maleic anhydride), poly(methyl vinyl ether-alt-maleic acid), and/or poly(acrylamide-co-diallyldimethylammonium chloride) (PDADAM).

In some embodiments, the carbon electrode comprises activated carbon, conductive carbon, and PVDF. The light harvesting supercapacitor further includes a metal layer disposed on the (activated) carbon electrode. In general the metal lay may be any suitable metal known to one of ordinary skill in the art. In some embodiments, the metal layer is an aluminum layer.

In some embodiments, the light harvesting supercapacitor has a specific capacitance of 125 to 150 F/g, preferably 127.5 to 142.5 F/g, preferably 130 to 137.5 F/g, preferably 132.5 to 135 F/g, preferably 133 F/g at a current density of 0.3 to 0.5 A/g, preferably 0.325 to 0.475 A/g, preferably 0.35 to 0.45 A/g, preferably 0.375 to 0.425 A/g, preferably 0.4 A/g.

In some embodiments, the light harvesting supercapacitor has an energy density of 10 to 20 W·h/Kg, preferably 11 to 19 W·h/Kg, preferably 12 to 18 W·h/Kg, preferably 13 to 17 W·h/Kg, preferably 14 to 16 W·h/Kg, preferably 14.5 to 15.5 W·h/Kg, preferably 15 W·h/Kg. In some embodiments, the light harvesting supercapacitor has a power density of 875 to 950 W/Kg, preferably 880 to 945 W/Kg, preferably 890 to 940 W/Kg preferably 895 to 935 W/Kg, preferably 900 to 930 W/Kg, preferably 905 to 925 W/Kg, preferably 910 to 920 W/Kg, preferably 912.5 to 917.5 W/Kg, preferably 915 W/Kg.

In some embodiments, the light harvesting supercapacitor has a bandgap of 2.5 to 2.95 eV, preferably 2.55 to 2.85 eV, preferably 2.6 to 2.8 eV, preferably 2.625 to 2.775 eV, preferably 2.65 to 2.75 eV, preferably 2.675 to 2.725 eV, preferably 2.70 eV.

In some embodiments, the device 300 of the present disclosure forms part of a photovoltaic cell. The photovoltaic cell may further comprise any other suitable components which would be recognized by one of ordinary skill in the art as useful for forming a solar cell using the light harvesting supercapacitor.

Method of Forming the Light Harvesting Supercapacitor

Referring to FIG. 1, a schematic flow diagram of the method 100 of preparing the light harvesting supercapacitor 300 is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes coating the transparent substrate with a paste comprising the $TiO_2$ nanoparticles to form a coated substrate. The transparent substrate may be as described above. The paste comprising the $TiO_2$ nanoparticles may be as described above. In some embodiments, the transparent substrate is FTO coated glass. In general, the method of coating may be any suitable method of coating a substrate with a paste. Examples of such coating method include, but are not limited to, spin coating, doctor blade-coating, dip coating, screen printing, inkjet printing, aerosol jet printing, metering rod coating, slot casting, and spray coating. In some embodiments, the coating is doctor blade coating.

At step 104, the method 100 includes heating the coated substrate to form an intermediate structure. In some embodiments, the coated substrate is heated to a temperature range of 400° C. to 600° C., preferably 425 to 575° C., preferably 450 to 550° C., preferably 475 to 525° C., preferably 490 to 510° C., preferably 500° C. to form the intermediate structure. The heating may be performed by any of the methods conventionally known in the art. The heating may be useful for removing non-$TiO_2$ constituents of the paste as described above.

At step 106, the method 100 includes immersing the first intermediate structure in a dispersion comprising the PANI nanoparticles and a solvent to form a first device portion. In some embodiments, the thickness of the first device portion can be adjusted by controlling the size of the PANI nanoparticles. In some embodiments, the PANI nanoparticles are prepared by a pulsed laser ablation in liquid (PLAL) technique. The PLAL technique involves exposing a suspension of PANI in a nanoparticle synthesis solvent to a pulsed laser having a wavelength of 520 nm to 550 nm, preferably 522 to 546 nm, preferably 524 to 542 nm, preferably 526 to 538 nm, preferably 528 to 536 nm, preferably 530 to 534 nm, preferably 532 nm and a pulse energy of 275 mJ/pulse to 425 mJ/pulse, preferably 280 to 420 mJ/pulse, preferably 285 to 415 mJ/pulse, preferably 290 to 410 mJ/pulse, preferably 295 to 405 mJ/pulse, preferably 300 to 400 mJ/pulse, preferably 305 to 395 mJ/pulse, preferably 310 to 390 mJ/pulse, preferably 315 to 385 mJ/pulse, preferably 320 to 380 mJ/pulse, preferably 325 to 375 mJ/pulse, preferably 330 to 370 mJ/pulse, preferably 335 to 365 mJ/pulse, preferably 340 to 360 mJ/pulse, preferably 345 to 355 mJ/pulse, preferably 350 mJ/pulse. In some embodiments, the nanoparticle synthesis solvent is an alcohol having 1 to 4 carbon atoms. Examples of such alcohols include, but are not limited to methanol, ethanol, n-propanol, 2-propanol, n-butanol, 2-butanol, ethylene glycol, propylene glycol, diethylene glycol, and glycerol. In some embodiments, the alcohol having 1 to 4 carbon atoms is ethanol. In some embodiments, the polyaniline is present in the suspension in an amount of 1 to 4 mg/mL, preferably 1.25 to 3.75 mg/mL, preferably 1.5 to 3.5 mg/mL, preferably 1.75 to 3.25 mg/mL, preferably 2 to 3 mg/mL, preferably 2.1 to 2.9 mg/mL, preferably 2.2 to 2.8 mg/mL, preferably 2.3 to 2.7 mg/mL, preferably 2.4 to 2.6 mg/mL, preferably 2.5 mg/mL of suspension. In some embodiments, the first intermediate structure is immersed in the dispersion for a period of 12 to 48 hours. The first intermediate structure i.e., the FTO conductive glass disposed with the $TiO_2$/PANI film forms the photoanode.

At step 108, the method 100 includes disposing the carbon electrode on a metal substrate to form a second device portion. In general, the disposing may be performed by any suitable technique, such as those described above. In some embodiments, the carbon electrode includes an activated carbon, conductive carbon, and PVDF, as described above. In such embodiments, the activated carbon, conductive carbon, and PVDF may be mixed to form a composite material which is then disposed on the metal substrate. In some embodiments, the metal substrate is aluminum as described above. The carbon electrode together with the metal substrate forms the back electrode in the device 300.

At step 110, the method 100 includes sandwiching the electrolyte layer between the active layer of the first device portion and the carbon electrode of the second device portion to form the light harvesting supercapacitor 300. In some embodiments, the electrolyte is a solid separator and PAMPS sandwiched between the photo anode and the back electrode, as described above.

The examples below are intended to further illustrate protocols for preparing and characterizing the light harvesting supercapacitor and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Materials Used:

PANI (emeraldine salt), ethanol, acetone and isopropanol were purchased from Sigma Aldrich™. $TiO_2$ nano paste and FTO conductive glass slides were purchased from Solaronix™ All the chemicals were of analytical grade and were used without any further purification.

Method of Preparation of Photo Anode

Figure 2:
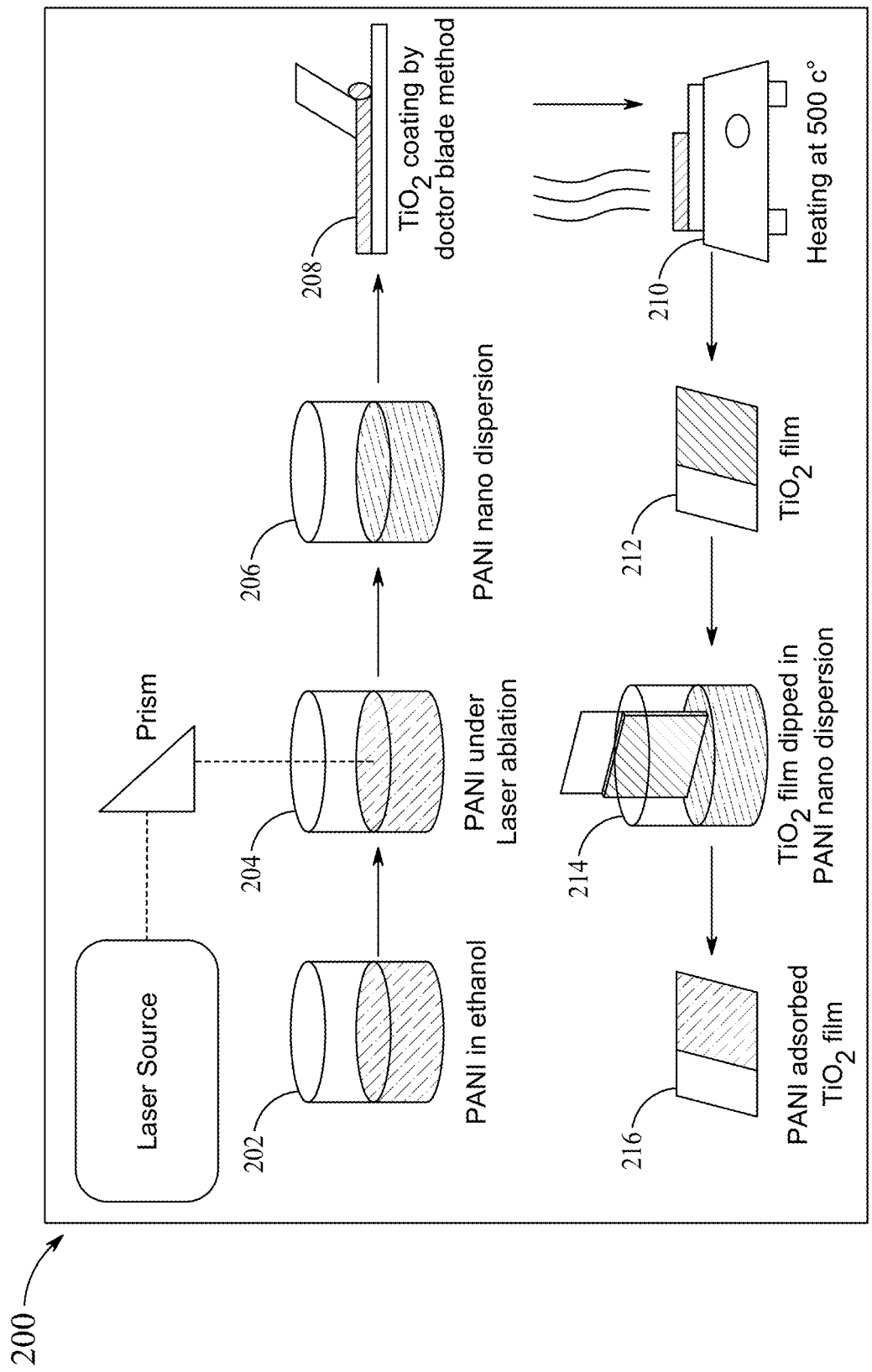
FIG. 2 is a schematic diagram of photo anode preparation, according to certain embodiments.

A schematic diagram depicting PANI nano synthesis using pulsed laser ablation and photo anode preparation using doctor blade technique followed by dip coating was illustrated in FIG. 2. The photo anode is an FTO conductive glass slide deposited with a $TiO_2$/PANI film. At step 202, 50 milligrams (mg) of PANI were dispersed in 20 milliliters (ml) of ethanol followed by 1 hour of sonication, to obtain a mixture. At step 204, the mixture was further irradiated by nanosecond Nd-YAG laser operating at second harmonic at 532 nanometers (nm) wavelength at a fluence of 350 mJ/pulse. The mixture was stirred continuously using a magnetic stirrer for 20 minutes of irradiation to ensure homogenous exposure of PANI (PANT nano-dispersion, step 206) to the laser. In parallel, at step 208, the FTO conductive glass slide was cleaned with de-ionized water, ethanol, acetone and isopropanol followed by 30 minutes of sonication to remove organic pollutants. At step 208, $TiO_2$ nano paste was coated on the FTO conductive glass slide using an automatic doctor blade machine (MRX Shenzhen Automation Equipment), such that the total area coated by the $TiO_2$ nano paste was maintained at 1 square centimeter ($cm^2$). At step 210, the FTO conductive glass slide with $TiO_2$ film was further heated to a temperature of 500° C. to remove all the organic binders and was then cooled slowly to room temperature to obtain a $TiO_2$ film (212). At step 214, the $TiO_2$ film was immersed in the PANI nano-dispersion for 24 hours to obtain the PANI adsorbed $TiO_2$ film (216).

Supercapacitor Device Architecture

The device 300 of the present disclosure was fabricated by joining photo anode ($TiO_2$/PANI) and back electrode (activated carbon paste on an aluminum (Al) foil) together with a paper separator (soaked in gel polymer electrolyte)

between the photo anode and the back electrode. A pictorial image of this device 300 is depicted in the FIG. 3A. The back electrode was prepared by coating an activated carbon paste on an aluminum (Al) current collector using an automatic doctor blade coating machine. The activated carbon paste was prepared using PVDF, active carbon (AC), conductive carbon (CC) and N-methyl pyrrolidine (NMP) as a solvent. The device 300 was fabricated in asymmetric configuration (FTO/TiO$_2$+PANI/paper separator/AC/Al). The FTO conductive glass slide coated with TiO$_2$ was found to be transparent, as can be observed in the FIG. 3B, however, only partial transparency was observed with the FTO conductive glass slide after coating PANI onto TiO$_2$ film.

Schematic Diagram Explaining Light Harvesting Mechanism

Figure 4:
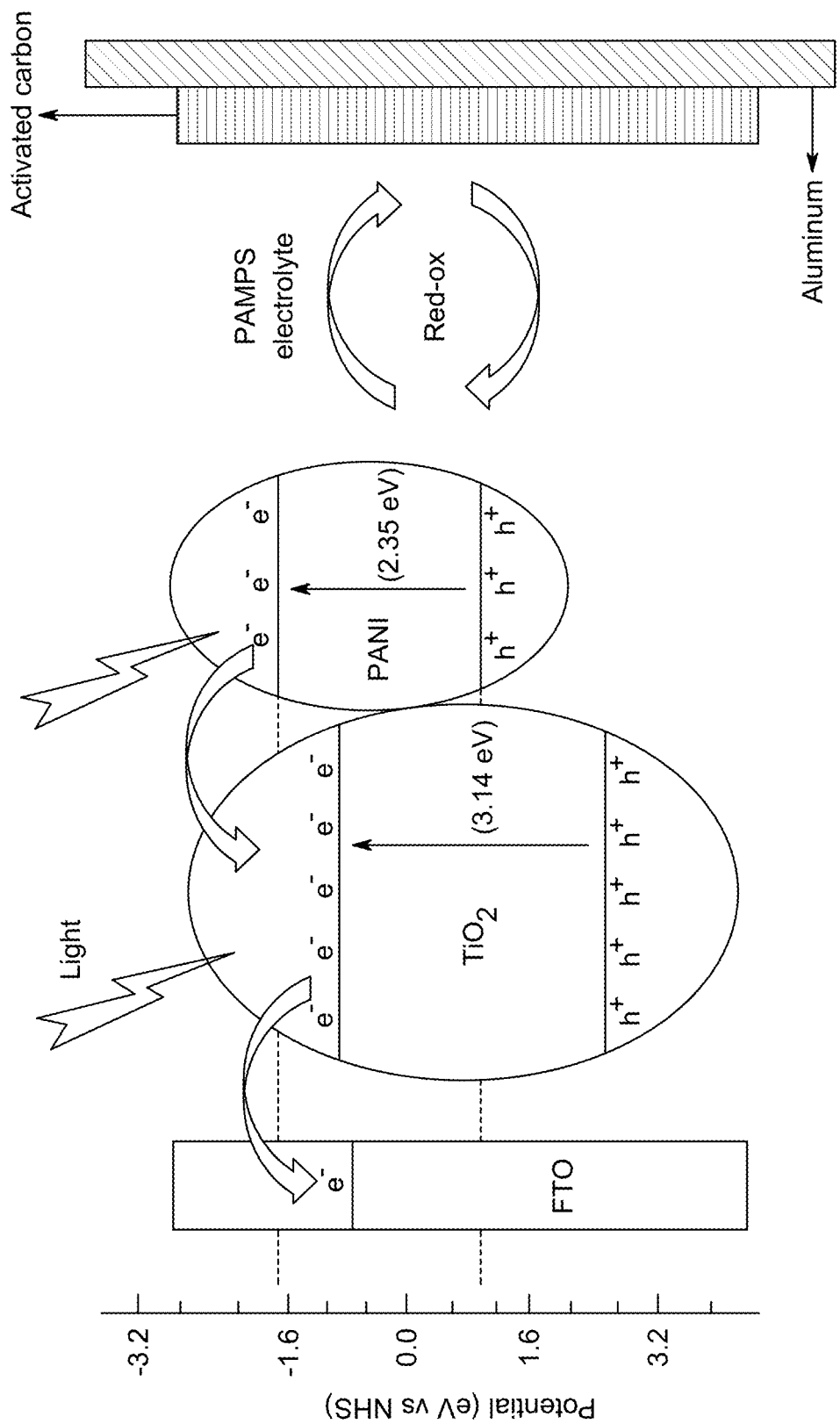
FIG. 4 depicts a schematic diagram of the light harvesting supercapacitor explaining light harvesting and charge transfer mechanism, according to certain embodiments.

TiO$_2$ is a well-known semiconductor with a band gap in UV region. On the other hand, PANI is a narrow band gap semiconductor with its conduction band slightly above the conduction band of the TiO$_2$ according to eV v/s NHE scale as shown in FIG. 4. PANI absorbs a photon in the visible region and excites its electron to the conduction band of PANI. This electron is then transferred to the conduction band of TiO$_2$ and then to FTO. The scarcity of the electron into PANI is replenished by the electrolyte in the electrolyte layer and the activated carbon through a redox reaction.

Surface Morphology of PANI and PANI Coated TiO$_2$

Figure 5A:
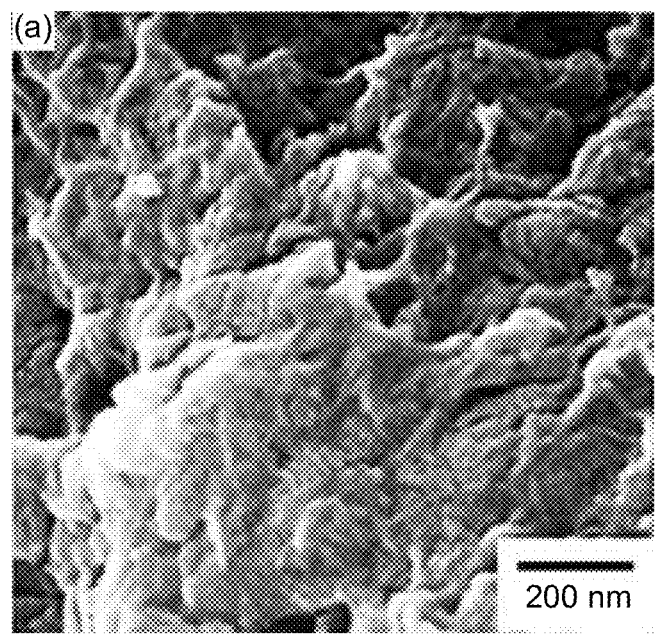
FIG. 5A depicts a Scanning Electron Microscope (SEM) image of PANI before laser ablation, according to certain embodiments.
Figure 5B:
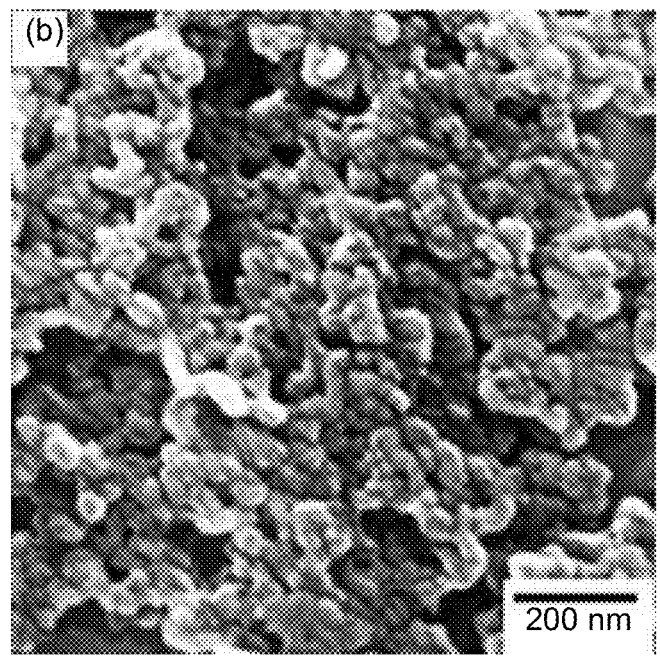
FIG. 5B depicts the SEM image of PANI after laser ablation, according to certain embodiments.
Figure 5C:
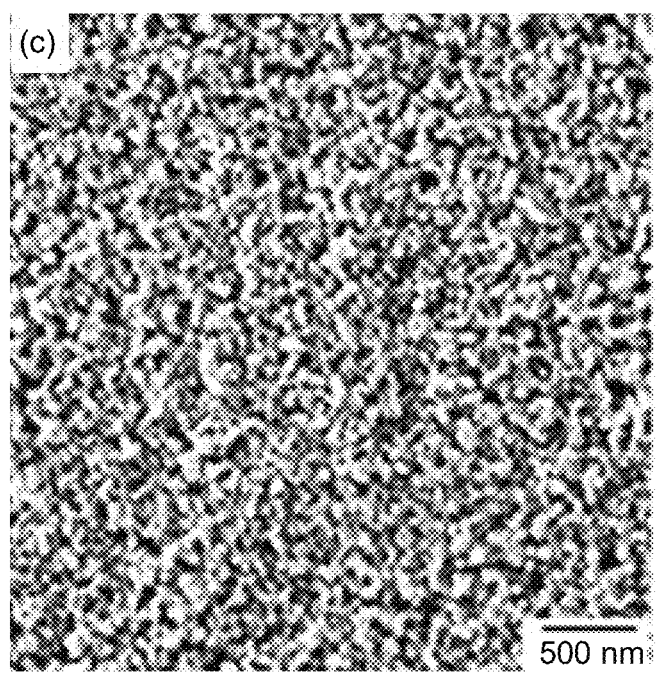
FIG. 5C depicts the SEM image of PANI adsorbed $TiO_2$ film, according to certain embodiments.

The surface morphology of PANI and TiO$_2$ coated on the FTO conductive glass slide was investigated using Field Emission Scanning Electron Microscope (FE-SEM), and the results of this study are depicted in FIGS. 5A-5C. The FE-SEM of PANI before laser ablation is depicted in the FIG. 5A. From the FIG. 5A micro sized particles of PANI can be observed. PANI was converted to nano PANI by laser ablation, and the results of the study are presented in the FIG. 5B. The PANI nanoparticles show agglomerated structure because of thermal effects and Ostwald ripening phenomena in which bigger crystals are formed at the expense of small crystallites. The SEM image of PANI adsorbed TiO$_2$ film at 100 kX magnification can be observed in the FIG. 5C.

Optical and Structural Properties of the Photo Anode

Figure 6A:
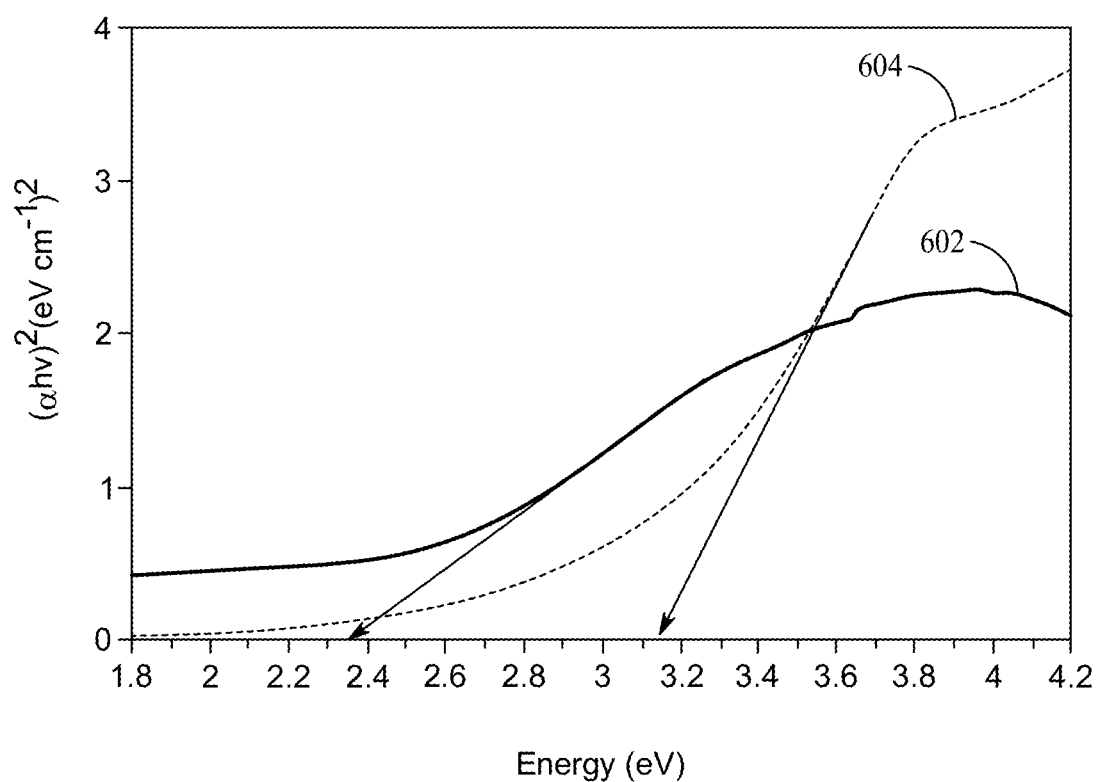
FIG. 6A depicts a Tauc's plot for a band gap measurement of $TiO_2$ and PANI separately obtained from ultraviolet (UV)-vis spectrophotometry, according to certain embodiments.
Figure 6B:
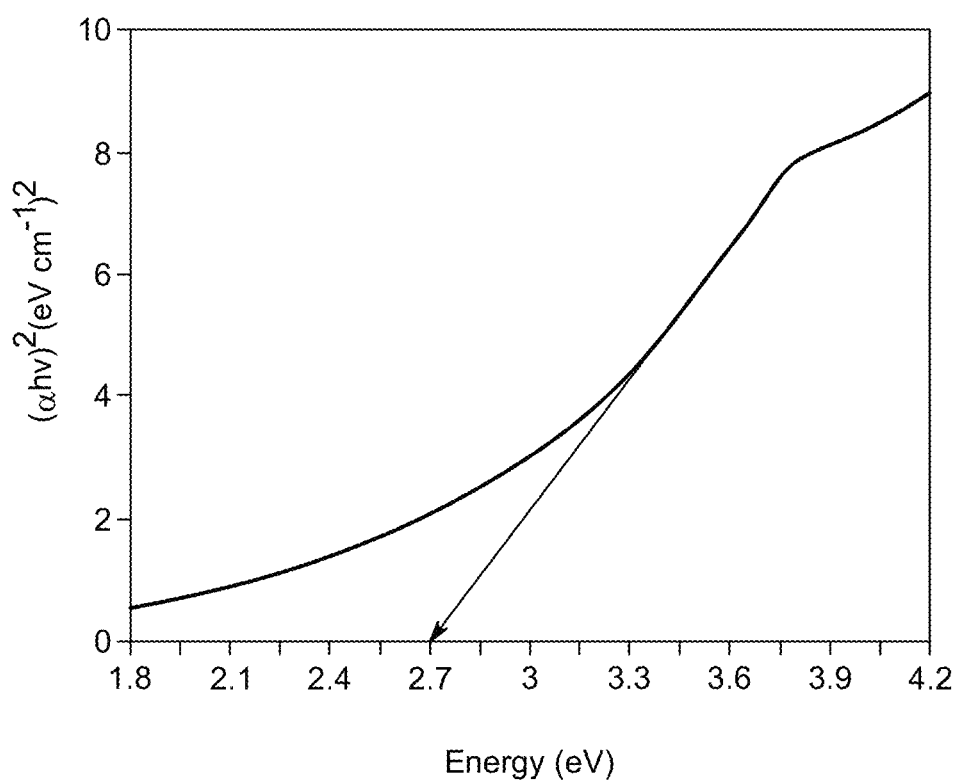
FIG. 6B depicts the Tauc's plot for a band gap measurement of PANI adsorbed $TiO_2$, according to certain embodiments.

The absorption spectra of TiO$_2$ and TiO$_2$/PANI electrode was measured using UV-vis spectrophotometry. The data obtained from this analysis was used to draw Tauc's plot. Tauc's plot is used to calculate the band gap of the material through extrapolation. The band gap energy for pure TiO$_2$ (604) and nano PANI (602) were found to be 3.14 eV and 2.35 eV, respectively, as can be observed in the FIG. 6A. The band gap energy of the PANI adsorbed TiO$_2$ film was found to be 2.70 eV as shown in FIG. 6B. From a combined reading of the FIGS. 6A and 6B, it is observed that the addition of PANI to TiO$_2$ has reduced the band gap of TiO$_2$ enabling a capacity to harvest more light in the visible region.

Figure 7:
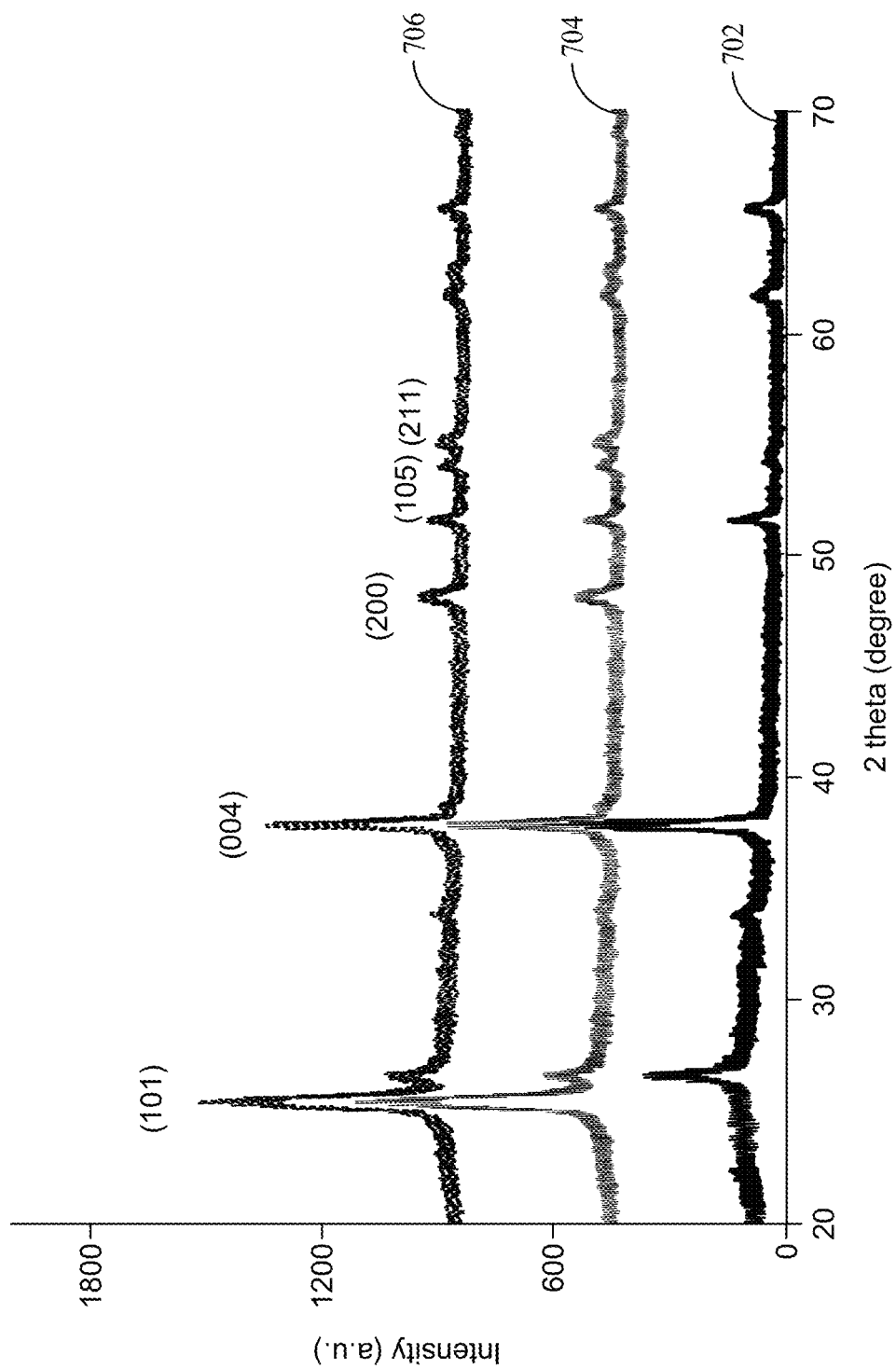
FIG. 7 is an X-ray diffraction (XRD) pattern for FTO, $TiO_2$ coated FTO and $TiO_2$/PANI coated FTO, according to certain embodiments.

The crystal structure of FTO (702), PANI (704), and PANI adsorbed TiO$_2$ photo anode (706), was studied using X-ray diffraction (XRD) technique. The analysis was performed from 20° to 80° using XRD (Bruker AXS D2 PHASER). TiO$_2$ major peaks were detected and labeled at 101, 004, 200, 105, and 211, as can be observed in the FIG. 7, which confirmed the anatase phase of the TiO$_2$ semiconductor.

Cyclic Voltammetry (CV) and Electrochemical Impedance Spectroscopy (EIS)

Figure 8:
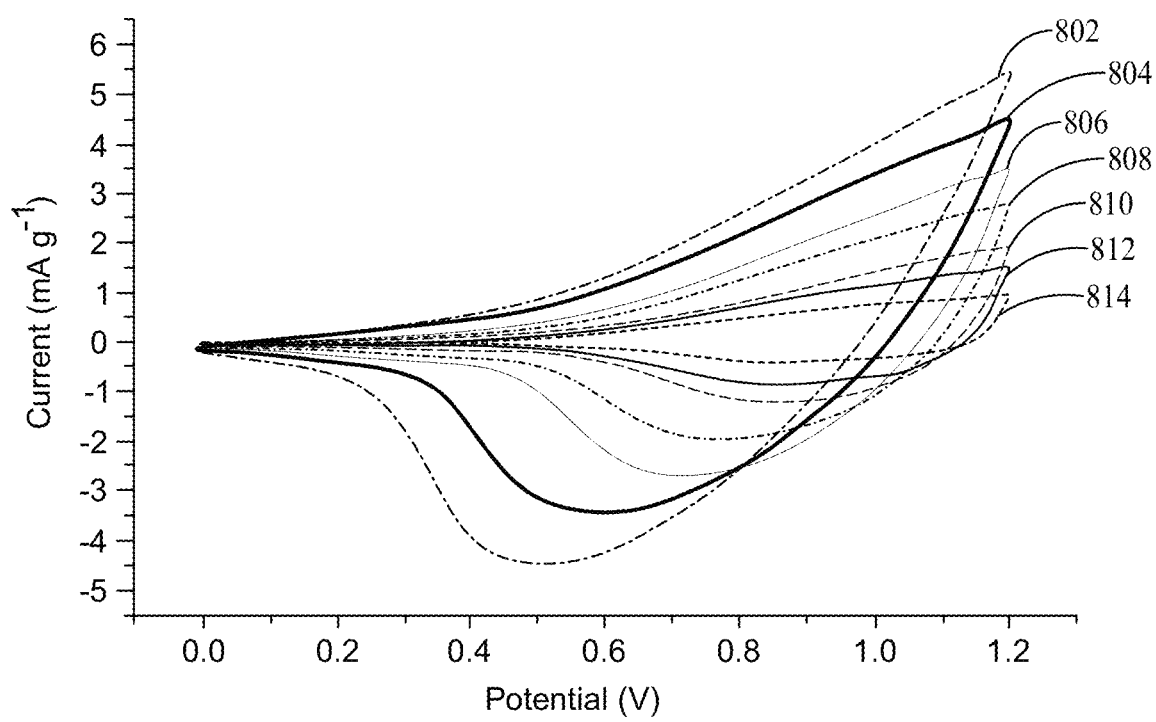
FIG. 8 depicts a cyclic voltammetry curve for $TiO_2$/PANI based supercapacitor using poly 2-acrylamido-2-methyl-1-propanesulfonic acid (PAMPS) electrolyte in two electrode assembly at different scan rates ranging from 20 $mVs^{-1}$ to 300 $mVs^{-1}$, according to certain embodiments.

The supercapacitive behavior of the device 300 was investigated using CV. The analysis was performed at different scan rates ranging from 20 mV s$^{-1}$ to 300 mV s$^{-1}$, particularly at 300 mVs$^{-1}$ (802), 200 mVs$^{-1}$ (804), 150 mVs$^{-1}$ (806), 100 mVs$^{-1}$ (808), 60 mVs$^{-1}$ (810), 40 mVs$^{-1}$ (812), and 20 mVs$^{-1}$ (814), in a potential window of 1.2 V as shown in (FIG. 8). The oxidation peak was obtained at 1.2 V whereas a shift in reduction potential was observed increasing the scan rate. There are no unwanted peaks in CV graph indicating a high stability of the device 300.

Figure 9A:
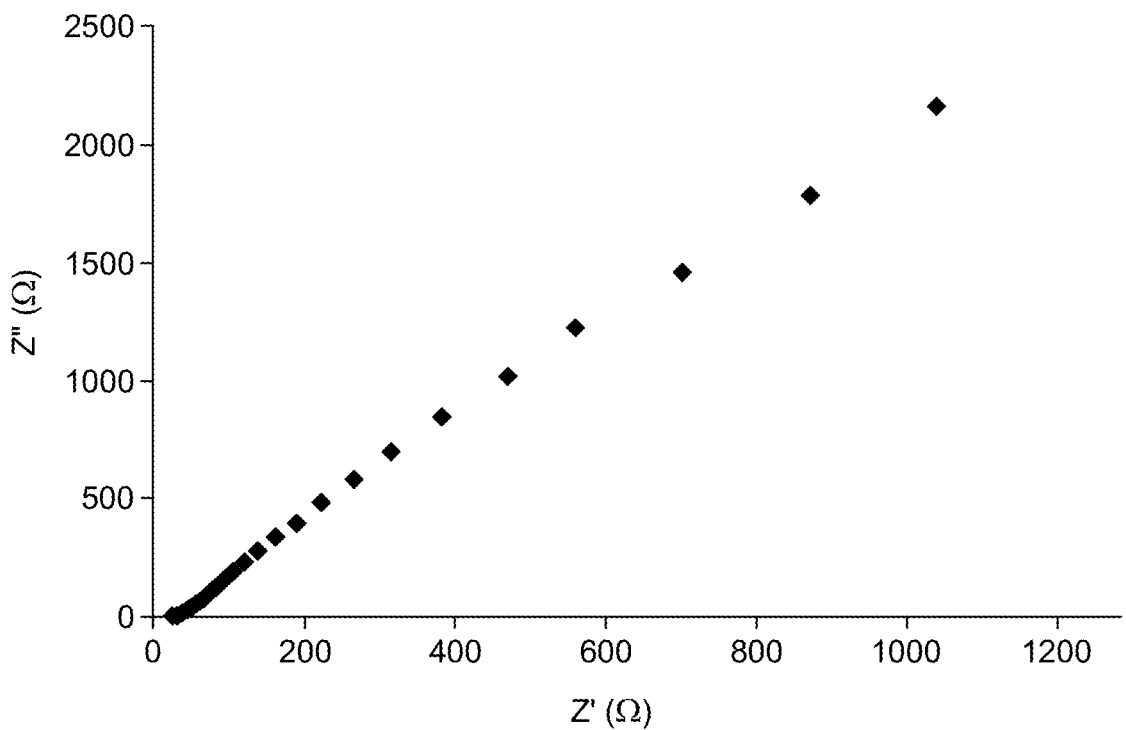
FIG. 9A is a Nyquist plot for the light harvesting supercapacitor using electrochemical impedance spectroscopy (EIS), according to certain embodiments.
Figure 9B:
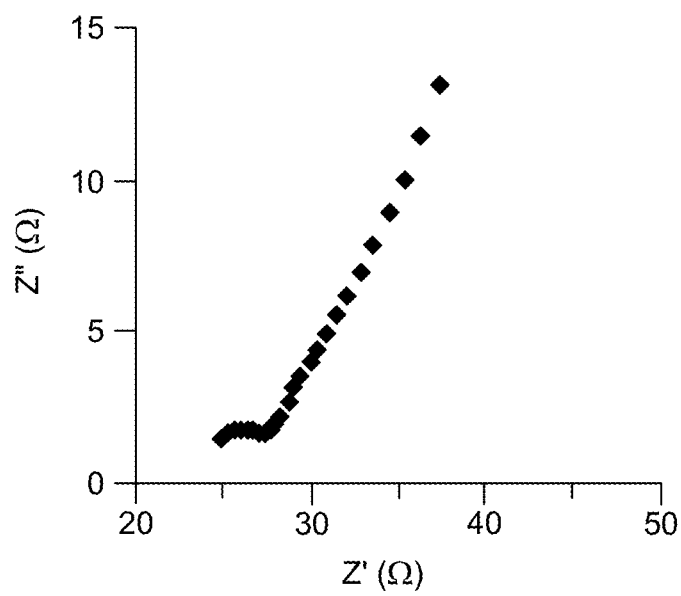
FIG. 9B is a magnified Nyquist plot to show the internal resistance of the light harvesting supercapacitor, according to certain embodiments.

FIG. 9A depicts a Nyquist plot of the device 300 obtained from the EIS. The Nyquist plot determines an internal resistance of the device 300. The enlarged graph was shown in FIG. 9B. The internal resistance was calculated and was found to be around 2.0Ω approximately, from the radius of the semicircle.

Galvanostatic Charge Discharge Measurement

Figure 10A:
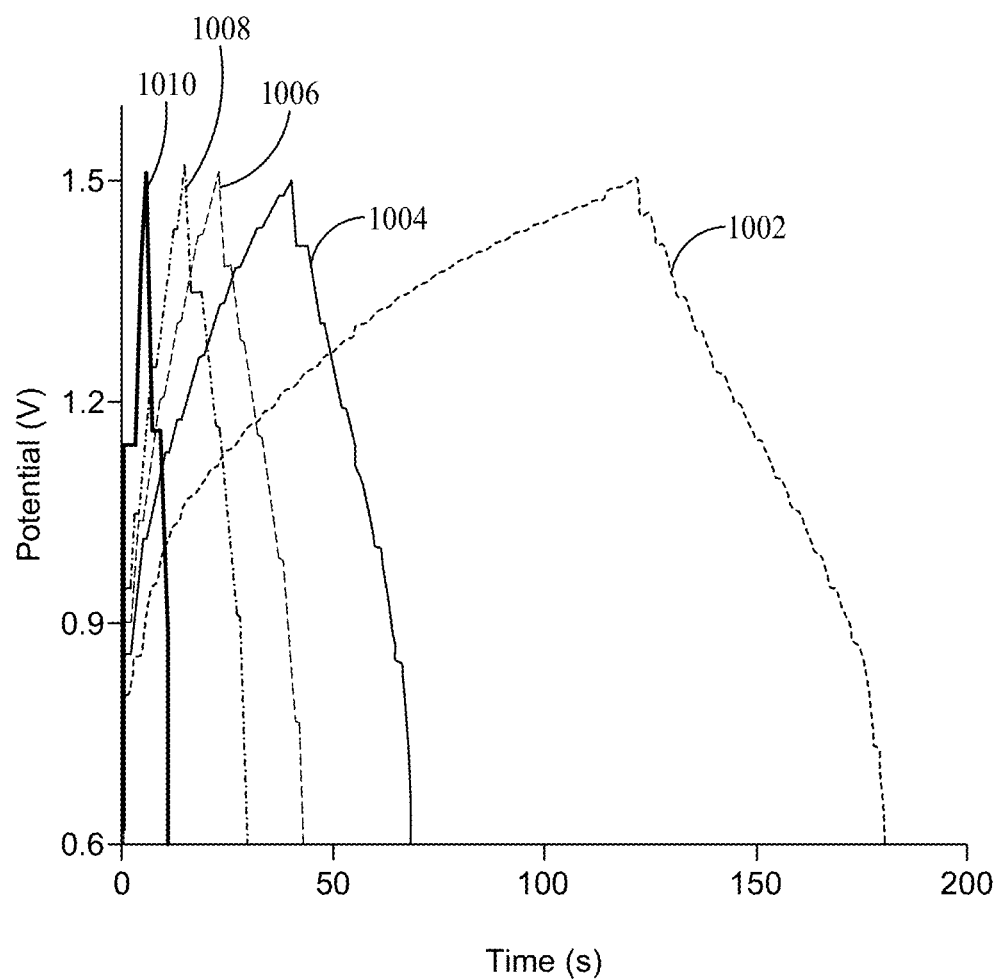
FIG. 10A is a galvanostatic charge discharge measurement for the light harvesting supercapacitor at different current densities ranging from 0.4 $A\ g^{-1}$ to 4.2 $A\ g^{-1}$, according to certain embodiments.
Figure 10B:
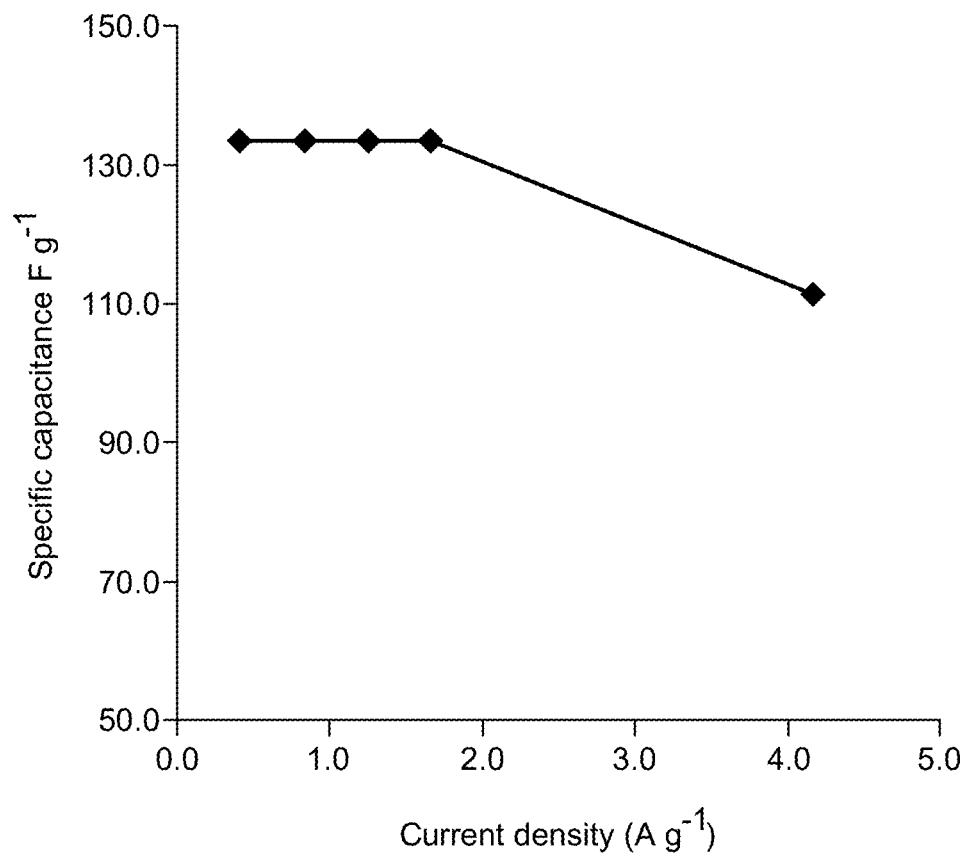
FIG. 10B depicts specific capacitance versus current density graph to show a stability of the light harvesting supercapacitor at higher current densities, according to certain embodiments.

The charge discharge measurement of the device was performed using battery analyzer (MTI Corp). The device 300 was charged to 1.5 V and discharged to 0.6 V at different current densities ranging from 0.4 A g$^{-1}$ to 4.2 A g$^{-1}$ namely, 0.4 A/g (1002), 0.8 A/g (1004), 1.3 A/g (1006), 1.7 A/g (1008), and 4.2 A/g (1010), as shown in FIG. 10A. The specific capacitance of the device 300 was calculated to be 133 F g$^{-1}$ at a current density of 0.4 A g$^{-1}$ (1010). The energy density of the device 300 based on the potential window (i.e., 0.9 V) was calculated to be 15 Wh kg$^{-1}$ at a power density of 915 W Kg$^{-1}$. The stability of the device 300 at higher current densities is depicted in FIG. 10B. The specific capacitance was found to decrease slightly at higher current densities indicating excellent reversibility during charging and discharging cycles.

Self-Charging Ability of the Fabricated Device Under Visible Light

Figure 11A:
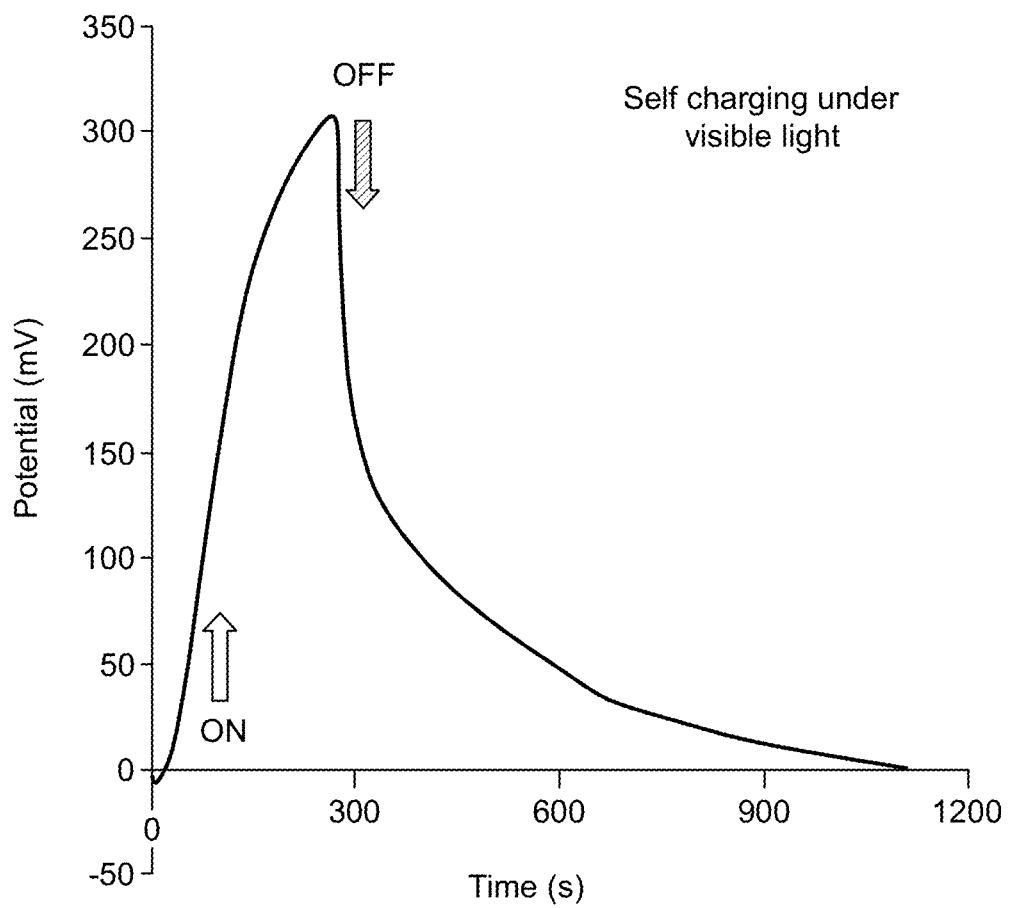
FIG. 11A depicts the light harvesting supercapacitor under visible light without any external bias using a 150-Watt xenon lamp equivalent to 1 sun, according to certain embodiments.
Figure 11B:
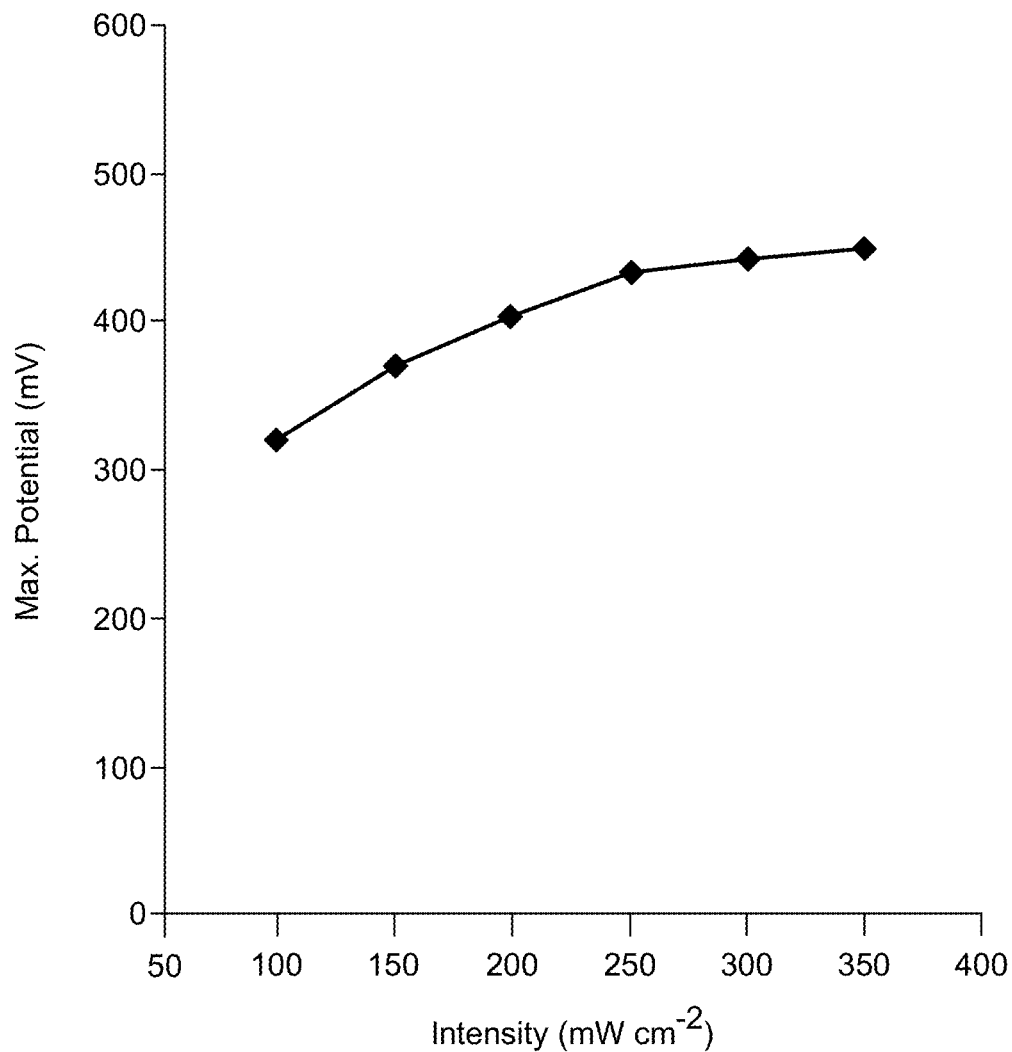
FIG. 11B depicts the effect of intensity of visible light on a self-generated potential of the light harvesting supercapacitor, according to certain embodiments.
Figure 11C:
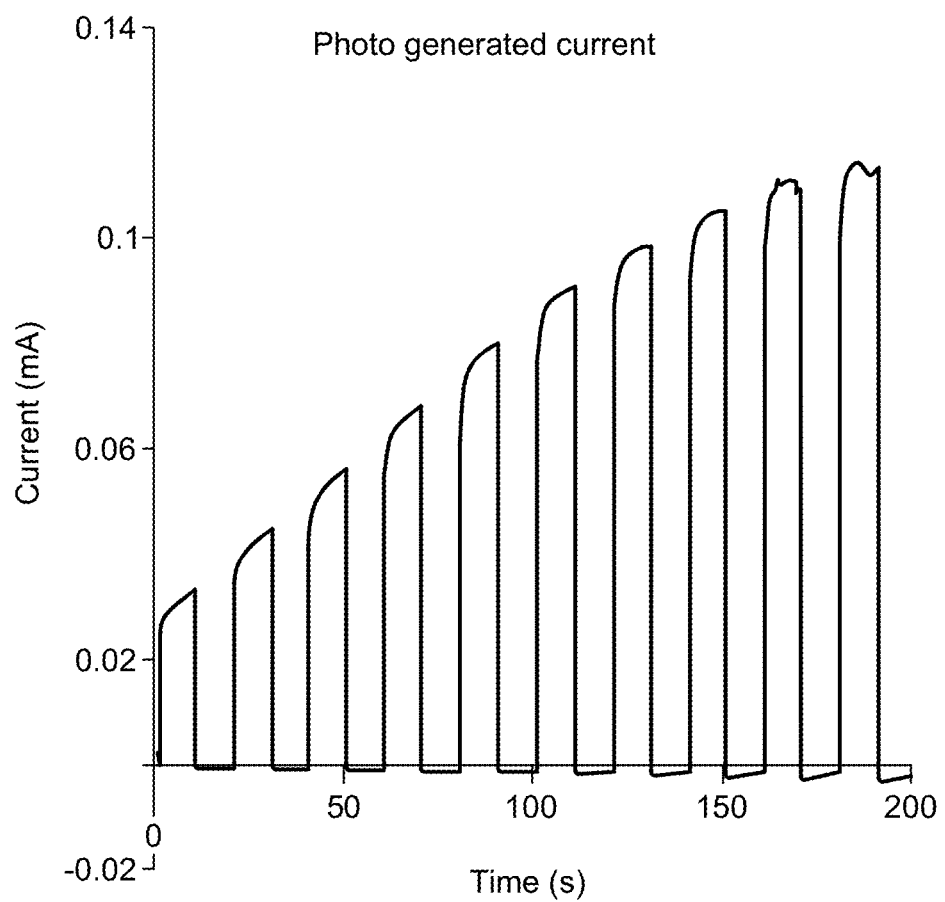
FIG. 11C depicts a photo generated current for successive ON and OFF cycles, according to certain embodiments.

The device 300 was further tested under visible light for its self-charging ability using 150 Watt Xenon lamp (comparable to sunlight). The results of this study are depicted in FIGS. 11A-11C. From the FIG. 11A it can be observed that the device 300 showed excellent charging and discharging response under visible light. The device 300 was charged to ~300 mV by shining light on the device, and the device 300 was further discharged by turning off the light. Discharging time was found to be much higher than the charging time making it very desirable for extended time applications. The effect of different light intensities on the maximum potential of the device 300 at different intensities was investigated, and the results of this study are presented in the FIG. 11B. The self-generated maximum potential increased with increasing the intensity of light. The photo generated current under successive ON and OFF cycles of light is depicted in the FIG. 11C. From the FIG. 11C, it can be observed that the photo generated current increased with time, till a maximum value of 0.15 mA.

Self-Charging Under UV

Figure 12A:
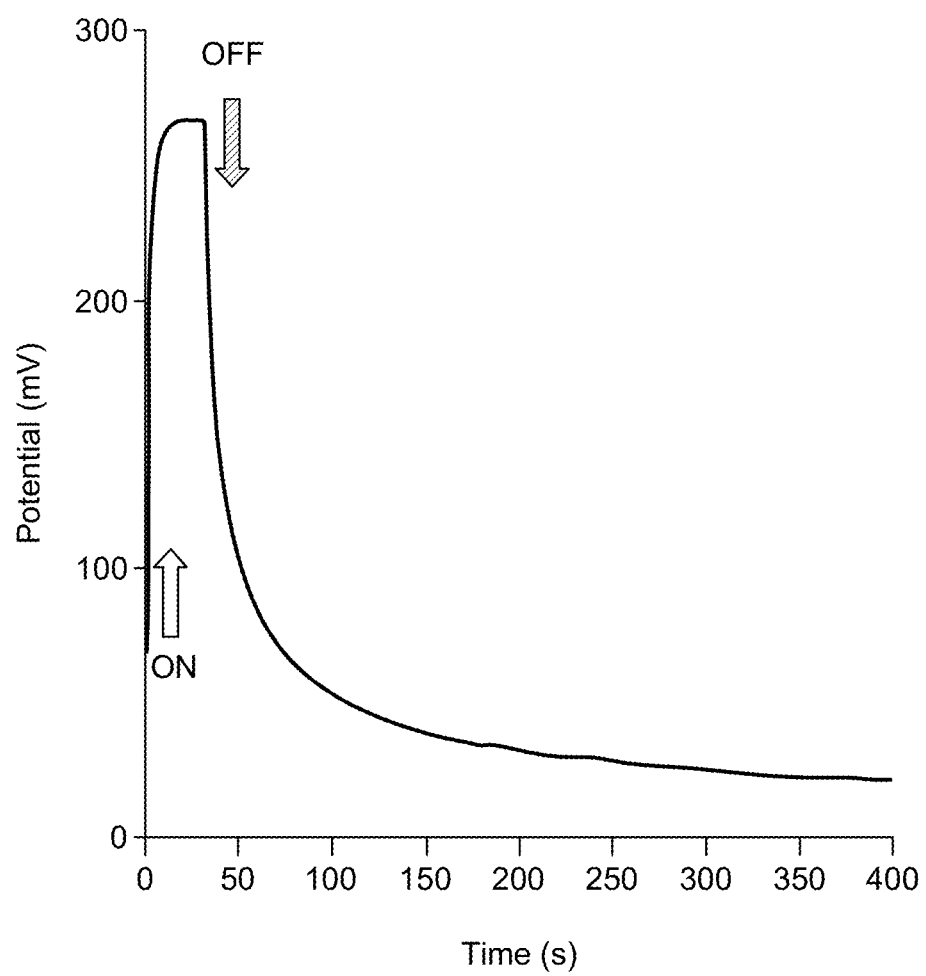
FIG. 12A is a graph depicting the light harvesting supercapacitor under UV without any external bias, according to certain embodiments.
Figure 12B:
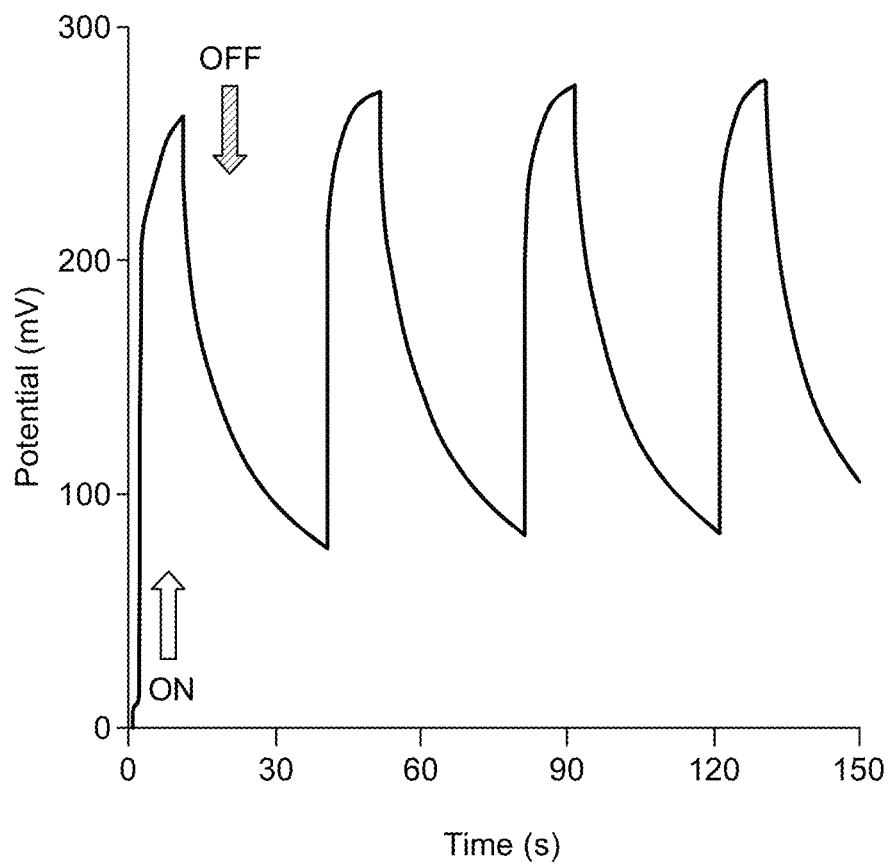
FIG. 12B depicts the charging and discharging behavior of the light harvesting supercapacitor under successive ON and OFF of UV to investigate charging and discharging ability of the light harvesting supercapacitor under UV, according to certain embodiments.
Figure 12C:
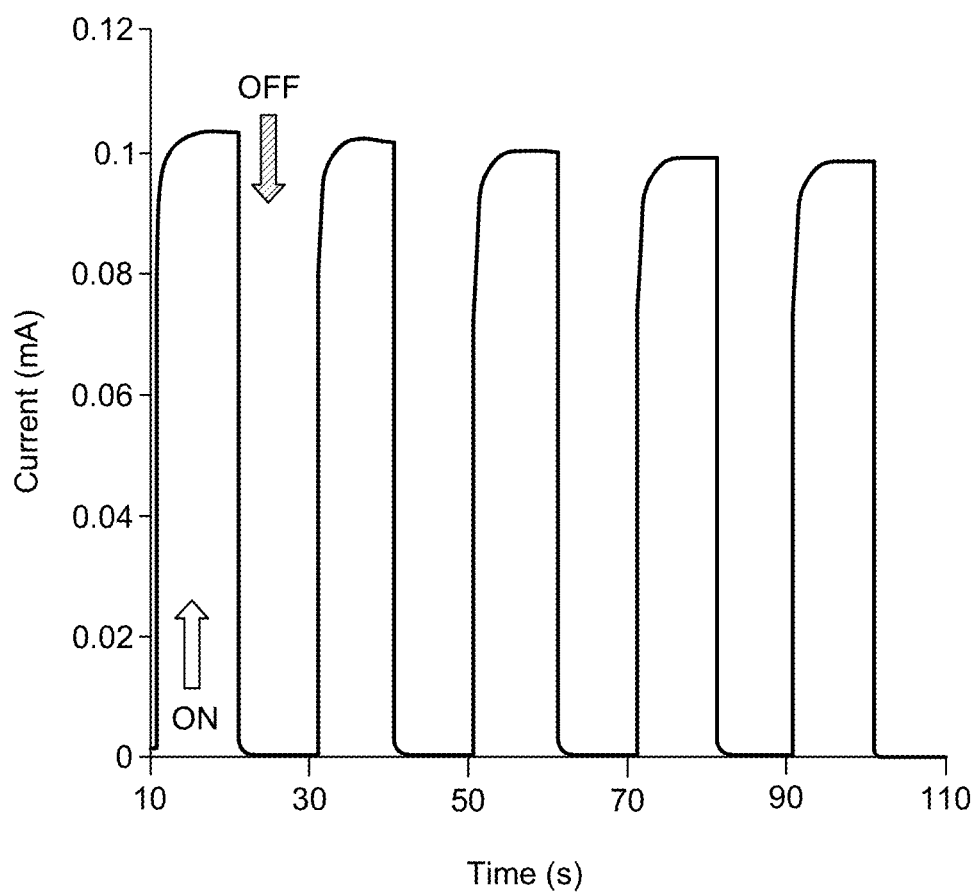
FIG. 12C depicts the charging and discharging behavior of the light harvesting supercapacitor under UV generated current under ON and OFF conditions, according to certain embodiments.

The self-charging ability of the device 300 was tested under the UV light without any external bias (FIG. 12A). From the FIG. 12A it can be observed that the charging and discharging of the device 300 was found to be faster in the UV light than under visible light. FIG. 12B depicts shows the charging and discharging behavior of the device under successive ON and OFF under UV. From the FIG. 12B it can be observed that the discharge time was found to be much higher than charging time under UV. FIG. 12C depicts the charging and discharging behavior of the device 300 under UV generated current under ON and OFF conditions. From the FIG. 12C it can be observed that the photo generated current reached to a maximum value and then started to decrease with passage of time as shown in FIG. 12C.

The invention claimed is:

1. A light harvesting supercapacitor, comprising:
a transparent substrate;
an active layer comprising TiO2 nanoparticles and polyaniline nanoparticles disposed on the transparent substrate;
an electrolyte layer comprising a solid separator and poly(2-acrylamido-2-methyl-1-propanesulfonic acid) disposed on the active layer;
an activated carbon electrode disposed on the electrolyte layer; and
a metal layer disposed on the activated carbon electrode.

2. The light harvesting supercapacitor of claim 1, wherein the transparent substrate is fluorine-doped tin oxide (FTO) coated glass.

3. The light harvesting supercapacitor of claim 1, wherein the transparent substrate is polyethylene terephthalate.

4. The light harvesting supercapacitor of claim 1, wherein the active layer comprises a $TiO_2$ sub-layer comprising the $TiO_2$ nanoparticles and a polyaniline sub-layer comprising the polyaniline nanoparticles.

5. The light harvesting supercapacitor of claim 4, wherein the $TiO_2$ sub-layer is disposed on the transparent substrate and the polyaniline sub-layer is disposed on the $TiO_2$ sub-layer such that the polyaniline sub-layer does not contact the transparent substrate.

6. The light harvesting supercapacitor of claim 1, wherein the $TiO_2$ nanoparticles are crystalline by Powder X-ray Diffraction (PXRD), adopt the anatase crystal structure, and have a mean particle size of 1 to 100 nanometers (nm).

7. The light harvesting supercapacitor of claim 1, wherein the polyaniline nanoparticles have a mean particle size of 10 to 200 nm.

8. The light harvesting supercapacitor of claim 1, wherein the electrolyte layer comprises a paper separator soaked with poly(2-acrylamido-2-methyl-1-propanesulfonic acid).

9. The light harvesting supercapacitor of claim 1, wherein the carbon electrode comprises activated carbon, conductive carbon, and polyvinylidene fluoride (PVDF).

10. The light harvesting supercapacitor of claim 1, wherein the metal layer is an aluminum layer.

11. The light harvesting supercapacitor of claim 1, having a specific capacitance of 125 to 150 farad per gram (F/g) at a current density of 0.3 to 0.5 ampere per gram (A/g).

12. The light harvesting supercapacitor of claim 1, having an energy density of 10 to 20 watt-hour per kilogram (W·h/Kg) and a power density of 875 to 950 watt per kilogram (W/Kg).

13. The light harvesting supercapacitor of claim 1, having a bandgap of 2.5 to 2.95 electron volt (eV).

14. A method of preparing the light harvesting supercapacitor of claim 1, the method comprising:
coating the transparent substrate with a paste comprising the $TiO_2$ nanoparticles to form a coated substrate;
heating the coated substrate to form an intermediate structure;
immersing the first intermediate structure in a dispersion comprising the polyaniline nanoparticles and a solvent to form a first device portion;
disposing the carbon electrode on a metal substrate to form a second device portion;
sandwiching the electrolyte layer between the active layer of the first device portion and the carbon electrode of the second device portion to form the light harvesting supercapacitor.

15. The method of claim 14, further comprising forming the polyaniline nanoparticles by exposing a suspension of polyaniline in a nanoparticle synthesis solvent to a pulsed laser having a wavelength of 525 to 550 nm and a pulse energy of 275 to 425 millijoules per pulse (mJ/pulse).

16. The method of claim 15, wherein the nanoparticle synthesis solvent is an alcohol having 1 to 4 carbon atoms and the polyaniline is present in the suspension in an amount of 1 to 4 mg/mL of suspension.

17. The method of claim 14, wherein the immersing is performed for 12 to 48 hours.

18. The method of claim 14, wherein the coating is performed by doctor blade-coating.

19. The method of claim 14, wherein the transparent substrate is FTO coated glass and the heating is performed at 400 to 600° C.

20. A photovoltaic device comprising the light harvesting supercapacitor of claim 1.

* * * * *